United States Patent
Ogawa et al.

(10) Patent No.: US 7,457,079 B2
(45) Date of Patent: Nov. 25, 2008

(54) MAGNETIC HEAD WITH RECTANGULAR-SHAPED PLANAR SPIRAL COIL AND LEADING CORE WIDTH SMALLER THAN TRAILING CORE WIDTH

(75) Inventors: Kazushi Ogawa, Kanagawa (JP); Teiichi Miyauchi, Kanagawa (JP); Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 10/606,108

(22) Filed: Jun. 25, 2003

(65) Prior Publication Data

US 2004/0070871 A1    Apr. 15, 2004

(30) Foreign Application Priority Data

Jul. 3, 2002    (JP)    ............................ P2002-194282

(51) Int. Cl.
| | |
|---|---|
| G11B 5/17 | (2006.01) |
| G11B 5/255 | (2006.01) |
| G11B 5/31 | (2006.01) |
| G11B 5/53 | (2006.01) |
| G11B 5/265 | (2006.01) |
| G11B 5/39 | (2006.01) |

(52) U.S. Cl. .............................. 360/123.19; 360/125.5; 360/125.54; 360/128

(58) Field of Classification Search ................. 360/126, 360/317, 129, 128, 122, 123, 124, 125, 121, 360/123.01, 123.18, 123.19, 123.59, 125.33, 360/125.41, 125.5, 125.54, 125.63

See application file for complete search history.

(56) References Cited

U.S. PATENT DOCUMENTS

| | | | | |
|---|---|---|---|---|
| 3,610,839 A | * | 10/1971 | Sand | .......................... 360/129 |
| 3,701,859 A | * | 10/1972 | Braun et al. | ................. 360/129 |
| 3,806,902 A | * | 4/1974 | Drees et al. | ................. 360/129 |
| 4,191,983 A | * | 3/1980 | Gibson | ....................... 360/123 |
| 4,293,884 A | * | 10/1981 | Schiller | ...................... 360/129 |
| 4,799,118 A | * | 1/1989 | Yamada et al. | .............. 360/126 |
| 4,947,541 A | * | 8/1990 | Toyoda et al. | ............... 360/119 |
| 5,173,826 A | * | 12/1992 | Bischoff | ..................... 360/123 |

(Continued)

FOREIGN PATENT DOCUMENTS

DE    3806171 A1 *    9/1989

(Continued)

Primary Examiner—Craig A Renner
(74) Attorney, Agent, or Firm—Robert J. Depke; Rockey, Depke & Lyons, LLC

(57) ABSTRACT

A thin film magnetic recording head comprises a substrate, a first magnetic core formed on the substrate, a second magnetic core having the front end face with a magnetic gap with respect to the front end face of the first magnetic core, and a coil for developing magnetic flux between the front end portions of the magnetic cores. A width of the second magnetic core at the front end portion thereof is chosen to be smaller than that of the first magnetic core. The second magnetic core is at a leading position relative to the second magnetic core in a traveling direction on a recording medium. In such configuration, it is possible to reduce side erase due to recording magnetic flux fringing and to achieve high density of magnetic recording while maintaining the conventional fabrication steps for the thin film magnetic recording head, thereby avoiding the problem in the fabrication.

18 Claims, 19 Drawing Sheets

U.S. PATENT DOCUMENTS

| | | | | |
|---|---|---|---|---|
| 5,349,745 A | * | 9/1994 | Kawabe et al. | 360/126 |
| 5,812,350 A | * | 9/1998 | Chen et al. | 360/126 |
| 5,822,161 A | * | 10/1998 | Yagyu | 360/126 |
| 5,831,801 A | * | 11/1998 | Shouji et al. | 360/126 |
| 5,850,325 A | * | 12/1998 | Miyauchi et al. | 360/126 |
| 5,973,891 A | * | 10/1999 | Neumann | 360/126 |
| 6,125,018 A | * | 9/2000 | Takagishi et al. | 360/317 |
| 6,259,585 B1 | * | 7/2001 | Sasaki et al. | 360/317 |
| 6,296,776 B1 | * | 10/2001 | Sasaki | 360/126 |
| 6,473,273 B1 | * | 10/2002 | Kikuiri | 360/271.5 |
| 6,504,687 B1 | * | 1/2003 | Miyatake et al. | 360/319 |
| 6,646,830 B2 | * | 11/2003 | Biskeborn et al. | 360/129 |
| 6,683,760 B1 | * | 1/2004 | Kikuiri | 360/319 |
| 6,697,231 B1 | * | 2/2004 | Kikuiri | 360/119 |
| 6,760,198 B2 | * | 7/2004 | Jarratt | 360/319 |
| 6,801,379 B2 | * | 10/2004 | Ozue et al. | 360/126 |
| 6,965,494 B2 | * | 11/2005 | Campbell et al. | 360/126 |
| 2001/0028539 A1 | * | 10/2001 | Kikuiri | 360/317 |
| 2002/0024764 A1 | * | 2/2002 | Takeya | 360/122 |
| 2002/0101683 A1 | * | 8/2002 | Katakura | 360/123 |
| 2002/0176214 A1 | * | 11/2002 | Shukh et al. | 360/317 |

FOREIGN PATENT DOCUMENTS

| | | | |
|---|---|---|---|
| JP | 60059513 A | * | 4/1985 |
| JP | 63108515 A | * | 5/1988 |
| JP | 63311615 A | * | 12/1988 |
| JP | 04195809 A | * | 7/1992 |
| JP | 06012622 A | * | 1/1994 |
| JP | 07-093711 | | 4/1995 |
| JP | 11213333 A | * | 8/1999 |
| JP | 11-306513 | | 11/1999 |
| JP | 2000-123319 | | 4/2000 |
| JP | 2001034906 A | * | 2/2001 |
| JP | 2001273606 A | * | 10/2001 |
| JP | 2002151332 A | * | 5/2002 |

* cited by examiner

Prior Art

Prior Art

Prior Art

MAGNETIC HEAD WITH RECTANGULAR-SHAPED PLANAR SPIRAL COIL AND LEADING CORE WIDTH SMALLER THAN TRAILING CORE WIDTH

CROSS REFERENCES TO RELATED APPLICATIONS

The present document is based on Japanese Priority Document JP 2002-194282, filed in the Japanese Patent Office on Jul. 3, 2002, the entire contents of which being incorporated herein by reference.

BACKGROUND OF THE INVENTION

1. Field of the Invention

The present invention relates to a magnetic head assembly and a magnetic tape drive unit and a magnetic disk drive unit using such magnetic head assembly, more specifically to a technology for increasing recording density by reducing side erasing regions due to recording magnetic flux fringing in a magnetic recording head that is fabricated in a thin film fabrication process.

2. Description of Related Art

A magnetic recording head comprises first and second magnetic cores made from magnetic materials and a coil for inducing a recording magnetic flux in these two magnetic cores, thereby developing a leakage magnetic flux between tips of these two magnetic cores.

Then, a recording medium is arranged to travel in the condition that the recording medium is in contact with or at adjacent to the tips of these magnetic cores. Application of a recording signal to the above-mentioned coil results in recording a magnetic signal on the recording medium.

Incidentally, as the recording density becomes increasingly high in recent years, there arise strong V needs for reducing the dimension or pitch of the recording tracks in the width direction thereof in the recording medium. In order to achieve this objective, it is required to reduce the width of the magnetic recording cores constituting the magnetic recording head, thereby leading to the development of the fabrication technology of so-called thin film fabrication process for the magnetic recording head. And the magnetic recording head fabricated in such thin film fabrication process is practically applied to hard disk drive units.

FIG. 19 and FIG. 20 illustrate a magnetic recording head (a) which is used in a hard disk drive unit. The magnetic recording head (a) comprises a slider (c) as a substrate for floating the magnetic recording head (a) during the time when a disk shaped recording medium (b) is traveling. The slider (c) is formed with a first magnetic core (d) and a second magnetic core (f) formed on the first magnetic core (d) having a non-magnetic film (e) between them (see FIG. 19).

The magnetic recording head (a) having the above configuration is disposed below a back edge of the slider (c). It is to be noted here that the back edge of the slider (c) means an end portion at a backward position of a traveling direction of the disk shaped recording medium (b).

Accordingly, the first magnetic core (d) is at a leading side of the disk shaped recording medium (b) as compared to the second magnetic core (f) at the time of recording a magnetic signal and thus the second magnetic core (f) is at a trailing side (see FIG. 19 and FIG. 20).

As a result of air flow caused by the traveling of the disk shaped magnetic recording medium (b), the slider (c) of the magnetic recording head (a) of the hard disk drive unit is in a condition floating from the disk shaped recording medium (b). And the magnetic recording head (a) is brought to a condition approaching to the disk shaped recording medium (b) (non-contacting with the disc shaped recording medium (b)) (see FIG. 20).

Incidentally, it is typical in the above-mentioned magnetic recording head (a) that the first magnetic core (d) is made to be wider than the second magnetic core (f) (see FIG. 19).

In the following descriptions, the terms "wider film" and "narrower film" are respectively used to refer to relatively wider and narrower films by comparing relative width of two laminated films.

As illustrated in FIG. 21, it is easier in the film forming process to form on a base (wider film (g)) a film (narrower film (h)) having a narrower width than the base (see FIG. 21).

However, if the wider film (g) is formed on the narrower film (h), both edges in the width direction overlap the both edge portions of the narrower film (h), thereby forming rounded portions and making it difficult to form a film in a desired shape, for example, elongated rectangular shape (see FIG. 22).

Accordingly, in order to form the wider film (g) on the narrower film (h), it is necessary to add a special step, for example, for forming a separate film (i) having the same thickness as the narrower film (h) along both edges thereof before forming the wider film (g) on both of the narrower film (h) and the separate film (i) (see FIG. 23).

However, it is not easy in such step to form the separate film (i) having the same thickness as the narrower film (h) along both right and left edges thereof. It is therefore difficult to form the wider film (g) of a desired shape on the separate film (i). For example, FIG. 24 shows an instance where the separate films (i) formed along both right and left edges of the narrower film (h) have thinner film thickness than that of the narrower film (h). On the contrary to the instance as shown in FIG. 24, if the thickness of the separate films (i) are thicker than the narrower film (h), the wider film (g) formed on the narrower film (h) tends to bend upwardly at both right and left edges, thereby making it difficult to obtain the wider film (g) in a desired shape.

Also, it is possible that gaps are occurred at junction portions between the narrower film (h) and the separate films (i). Even if the wider film (g) is formed on such films, the shape is different from the desired one (see FIG. 25).

Accordingly, in a case of fabricating the magnetic recording head (a) in the thin film fabrication process as described hereinabove, it is typical to fabricate the first magnetic core (d) to have a larger width than that of the second magnetic core (f).

Incidentally, as described hereinabove, the width of the first magnetic core (d) at the leading side in the magnetic recording head (a) is larger than that of the second magnetic core (f) at the trailing side. This increases the side erase regions due to the so-called recording magnetic flux fringing, thereby resulting in a poor S/N (signal-to-noise) ratio.

Describing more in detail, a magnetic signal to be recorded is developed by the leakage magnetic flux between the first magnetic core (d) at the leading side and the second magnetic core (f) at the trailing side. The leakage magnetic flux includes "α" developed at the edge portion (j) of the gap between the first magnetic core (d) and the second magnetic core (f) and "β" developed at both ends (k, k) between the first magnetic core (d) and the second magnetic core (f) (see FIG. 26).

Now, the leakage magnetic flux "α" developed at the edge portion (j) of the magnetic gap between the first magnetic core (d) and the second magnetic core (f) is oriented in parallel with the traveling direction of the disk shaped recording medium (b) with respect to the edge portion (j) of the magnetic gap of the second magnetic core (f). The magnitude of the leakage magnetic flux is the maximum in the magnetic gap but sharply decrease from the edge portion (j) of the second magnetic core (f) to the trailing side. Accordingly, a recording pattern that is recorded by the leakage magnetic flux "α" developed between the first magnetic core (d) and the edge portion (j) closer to the magnetic gap of the second magnetic core (f) is as illustrated in FIG. 27 by "γ", or substantially following a shape along the edge-portion (j) closer to the magnetic gap of the second magnetic core (f).

In contrast to the above, the leakage magnetic flux "β" that is developed between the first magnetic core (d) and the both ends (k, k) in the width direction of the second magnetic core (f) has an angle which is perpendicular or close to perpendicular to the traveling direction of the disk shaped magnetic recording medium (b) with respect to the both ends (k, k) in the head width direction of the second magnetic core (f). The magnitude of the leakage magnetic flux decreases gradually from the junction to the edge portion (j) closer to the magnetic gap along the both ends (k, k) in the head width direction of the second magnetic core to the trailing side. Accordingly, a recording pattern as recorded by the leakage magnetic flux "β" that is developed between the first magnetic core (d) and the both sides (k, k) in the head width direction of the second magnetic core (f) is largely extended toward the trailing side rather than the junction to the edge portion (j) closer to the magnetic gap of the second magnetic core (f) as shown by a shape (m) in FIG. 27.

As a result, when the magnetic signal is recorded, there occur the portion "γ" due to the above-mentioned leakage magnetic flux "α" and the portions (m, m) extending backwardly like tails from both sides for a single bit pattern "l" because of the difference in orientations of the leakage magnetic flux "α" for the edge portion (j) closer to the magnetic gap of the second magnetic core (f) and the leakage magnetic fluxes "β" at both sides in the head width directions of the second magnetic core (f), and the difference in rates of reducing magnitudes of the leakage magnetic fluxes in the traveling direction of the disk shaped recording medium (b) (see FIG. 27). FIG. 27 illustrates concept of a single bit recording pattern "l". Apparently, FIG. 27 illustrates how the recording pattern "l" is extending backwardly in bands at the both side portions (m, m) in the track width direction of the recording pattern "l".

It is conceivable that the phenomena occurs because the opposed portions in the traveling direction of the disk shaped recording medium (b) at both end portions at the leading side of the first magnetic core (d) (the wider magnetic core) do not exist in the second magnetic core (f) (the narrower magnetic core) at the trailing side.

And the above-mentioned band portions (m, m) (that may be referred to as extending portions below) for a single bit recording pattern "l" are overwritten on the previously recorded recording pattern "l" for the next preceding bit, thereby causing the so-called side erase and thus effectively reducing the width of the recording track and degrading the SIN ratio.

Concretely, assuming that a single bit recording pattern is, for example, 1.96 μm in width (which is approximately equal to the width of the first magnetic core (d)) and 1 μm in length in the direction of the recording track. The base end portions of the band portions (m, m) extending backwardly at both end portions are 0.21 μm in the width direction of the track and 0.4 μm in length (see FIG. 28).

If plurality bits of such recording pattern "l" having the above shape are formed, the band portions (m, m) of a recording pattern "l2" are overwritten on a recording pattern "l1" for the next previous bit, thereby decreasing the effective width of the recorded pattern "l1" of the bit to 1.96−0.21×2=1.54 μm (see FIG. 27).

This means that, despite the formation of the recording track by the magnetic core (the first magnetic core) (d) having the width of 1.96 μm, the effective width of the recording track is only 1.54 μm, thereby degrading the S/N ratio.

Technologies to prevent such recording magnetic flux fringing are disclosed, for example, in Japanese patent publication nos. 7-93711 and 11-306513.

FIG. 29 illustrates a simplified construction of the magnetic head (n) as disclosed in the above-mentioned Japanese patent publication no. 7-93711. The magnetic head (n) is a so-called merge type magnetic head having a magnetic reproducing head (o) and a magnetic recording head (p). One of the magnetic shields for the magnetic reproducing head and one of the magnetic cores of the magnetic recording head are made in common and the common magnetic member is referred to as an intermediate magnetic core.

The magnetic reproducing head (o) is fabricated by forming a magnetic shield (r) on a slider (substrate) (q) and also forming an intermediate magnetic core (t) on the magnetic shield (r) with an MR device (s) disposed therebetween. It is to be noted, however, that a non-magnetic member is formed between the magnetic shield (r) and the MR device (s) and between the MR device (s) and the intermediate magnetic core (t).

On the other hand, the magnetic recording head (p) is fabricated by forming the above-mentioned intermediate magnetic core (t) and a magnetic core (u) on the intermediate magnetic core (t) with a non-magnetic member formed therebetween, wherein the width of the magnetic core (u) is wider than that of the intermediate magnetic core (t). It is to be noted that the non-magnetic member interposed between the intermediate magnetic core (t) and the magnetic core (u) acts as a magnetic gap for the magnetic recording head.

According to the magnetic recording head (p) having the above-mentioned configuration, the portion opposed in the traveling direction of the disk shaped recording medium (b) to the both end portions of the intermediate magnetic core (t) (the narrower magnetic core) at the leading side is located in the magnetic core (u) (the wider magnetic core) at the trailing side. As a result, the recording pattern by the leakage magnetic flux that is developed at both end portions of the intermediate magnetic core (t) (narrower magnetic core) at the leading side is recorded again by the leakage magnetic flux that is developed at the edge portion of the trailing side magnetic core (u) closer to the magnetic gap. In this case, the orientation of the leakage magnetic flux that is developed at the edge portion of the trailing side magnetic core (u) closer to the magnetic gap completely coincides with the traveling direction of the disk shaped recording medium (b). And the magnitude of the leakage magnetic flux sharply decreases as the distance increases from the edge portion of the magnetic core (u) closer to the magnetic gap to the trailing side. The recording pattern substantially follows the edge portion of the magnetic core (u) closer to the magnetic gap, thereby developing essentially no band portions (m, m) that were developed on the recording pattern "l" and thus overcoming the so-called side erase problem.

However, in the magnetic recording head (p) as disclosed in Japanese patent publication no. 7-93711, it is required to form on the intermediate magnetic core (t) the magnetic core (u) that is wider than the intermediate magnetic core (t). This encounters the above-mentioned fabrication problem of forming a wider film (g) on a narrower film (h) (see FIG. 22, FIG. 24 and FIG. 25).

On the other hand, FIG. 30 illustrates a simplified construction of the magnetic head (v) as disclosed in Japanese patent publication no. 11-306513. The magnetic head (v) is also the so-called merge type magnetic head having a magnetic reproducing head (w) and a magnetic recording head (x). Only difference of the magnetic head (v) from the magnetic head (n) as disclosed in the above Japanese patent publication no. 7-93711 is the shape of the intermediate magnetic core. Accordingly, the same reference numerals as those for the magnetic head (n) are used to refer to the other corresponding parts and their descriptions are omitted herein.

The intermediate magnetic core (y) of the magnetic head (v) has substantially the same width as the magnetic shield (r) of the magnetic reproducing head (w) and a protruding portion (z) having a narrower width than the width of the magnetic core (u) is formed at the portion opposed to the magnetic core (u) of the magnetic recording head (x).

According to the magnetic recording head (x) of the above configuration, the recording pattern by the leakage magnetic flux from the both edges of the protruding portion (z) (acting as the narrower magnetic core) of the intermediate magnetic core at the leading side is recorded again by the leakage magnetic flux that is developed at the edge portion closer to the magnetic gap side of the magnetic core (u) (the wider magnetic core) at the trailing side. In this case, the orientation of the leakage magnetic flux that is developed at the edge portion closer to the magnetic gap of the magnetic core (u) at the trailing side is completely equal to the traveling direction of the disk shaped recording medium (b) and the magnitude of the leakage magnetic flux sharply decreases at the location departing from the edge portion closer to the magnetic gap of the magnetic core (u) to the trailing side. Accordingly, the recording pattern substantially follows the shape of the edge portion closer to the magnetic gap of the magnetic core (u), thereby developing essentially no band portions (m, m) on the recording pattern "l" and thus overcoming the so-called side erase problem.

However, in the magnetic recording head (x) as disclosed in the Japanese patent publication no. 11-306513, the intermediate magnetic core (y) is wider than the magnetic core (u) which is formed on the above-mentioned protruding portion (z). Accordingly, the wider member (u) is formed on the narrower member (z), thereby encountering the fabrication problem of forming the wider film (g) on the narrower film (h) as described hereinabove by reference to FIG. 22 through FIG. 25.

SUMMARY OF THE INVENTION

It is therefore an object of the present invention to increase magnetic recording density by avoiding the fabrication problem of forming a wider film on a narrower film and thus reducing the side erase due to the so-called recording magnetic flux fringing while maintaining the conventional fabrication steps of thin film magnetic recording heads.

In order to achieve the above object, a magnetic head assembly according to the present invention utilizes a magnetic recording head fabricated in a thin film fabrication process and comprising a substrate, a first magnetic core formed on the substrate, a second magnetic core formed in a condition that front end portions of the first and second magnetic cores provide a predetermined magnetic gap and back end portion of the second magnetic core is connected to the first magnetic core, and a coil disposed between the first magnetic core and the second magnetic core for developing a magnetic flux between the front end portions of the both magnetic cores; a width of the second magnetic core at the front end portion thereof being made equal to or smaller than that of the first magnetic core; and the second magnetic core rather than the first magnetic core being at a leading position in a traveling direction on a magnetic recording medium.

Also, a magnetic tape drive unit according to the present invention utilizes a magnetic recording head fabricated in a thin film fabrication process and comprising a substrate, a first magnetic core formed on the substrate, a second magnetic core formed in a condition that front end portions of the second magnetic core and the first magnetic core provides a predetermined magnetic gap and a back end portion of the second magnetic core is connected to the first magnetic core, and a coil disposed between the first magnetic core and the second magnetic core for developing a magnetic flux between the front end portions of the both magnetic cores; a width of the second magnetic core at the front end portion being made equal to or smaller than that of the first magnetic core; and the second magnetic core rather than the first magnetic core being at a leading position in a traveling direction on a tape shaped recording medium.

Furthermore, a magnetic disk drive unit according to the present invention utilizes a magnetic recording head fabricated in the thin film fabrication process and comprises a substrate, a first magnetic core formed on the substrate, a second magnetic core formed in a condition that front end portions of the second magnetic core and the first magnetic core provide a predetermined magnetic gap and a back end portion of the second magnetic core is connected to the first magnetic core, and a coil disposed between the first magnetic core and the second magnetic core for developing a magnetic flux between the front end portions of the both magnetic cores; a width of the second magnetic core at the front end portion being made equal to or smaller than that of the first magnetic core; and the second magnetic core rather than the first magnetic core being at a leading position in a traveling direction of a disk shaped recording medium.

Accordingly, since the first magnetic core fabricated in the thin film fabrication process is at a trailing position, while the width of the second magnetic core at the front end portion thereof is made equal to or smaller than that of the first magnetic core in the present invention, a recording pattern recorded by the leakage magnetic flux developed at the both ends in the width direction of the second magnetic core is recorded again by the leakage magnetic flux at the edge portion closer to the magnetic gap of the first magnetic core.

The magnetic head assembly and the magnetic tape drive unit and the magnetic disk drive unit utilizing the magnetic head assembly according to the present invention enable to reduce side erase due to recording magnetic flux fringing and to increase magnetic recording density while using the magnetic recording head fabricated in the conventional thin film fabrication process in which a narrower film is formed on a wider film.

Additionally, since an auxiliary member is adhered onto the leading and/or trailing side of the magnetic recording head in the traveling direction of the magnetic recording medium according to the present invention, thrashing of the tape shaped recording medium can be suppressed if the auxiliary member is provided at the leading side, thereby stabilizing the tape shaped recording medium before contacting with the magnetic recording head and reducing any force to be applied to the magnetic recording head in the peeling direction of the films thereof when the tape shaped recording medium is brought into contact with the magnetic recording head.

On the other hand, if the auxiliary member is provided at the trailing side, any force to be applied in the peeling direction of the films is received by the auxiliary member, thereby preventing the films from being peeled off.

Moreover, since the saturation magnetic flux density of the material from which the first magnetic core is made is chosen to be larger than that of the second magnetic core in the present invention, magnetic flux exiting from the second magnetic core is sufficiently absorbed in the first magnetic core, thereby further reducing recording magnetic flux fringing.

In another aspect of the present invention, the first magnetic core comprises two or more kinds of stacked films. Since a saturation magnetic flux density of the material of at least one of the stacked films closest to the magnetic gap is chosen to be larger than that of the second magnetic core, a magnetic flux exiting from the second magnetic core is sufficiently absorbed in the first magnetic core, thereby further reducing recording magnetic flux fringing.

Although materials having a larger saturation magnetic flux density are relatively expensive, the present invention helps to sufficiently reduce recording magnetic flux fringing even if the amount of such expensive materials to be used is decreased.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF EMBODIMENTS

Figure 1:
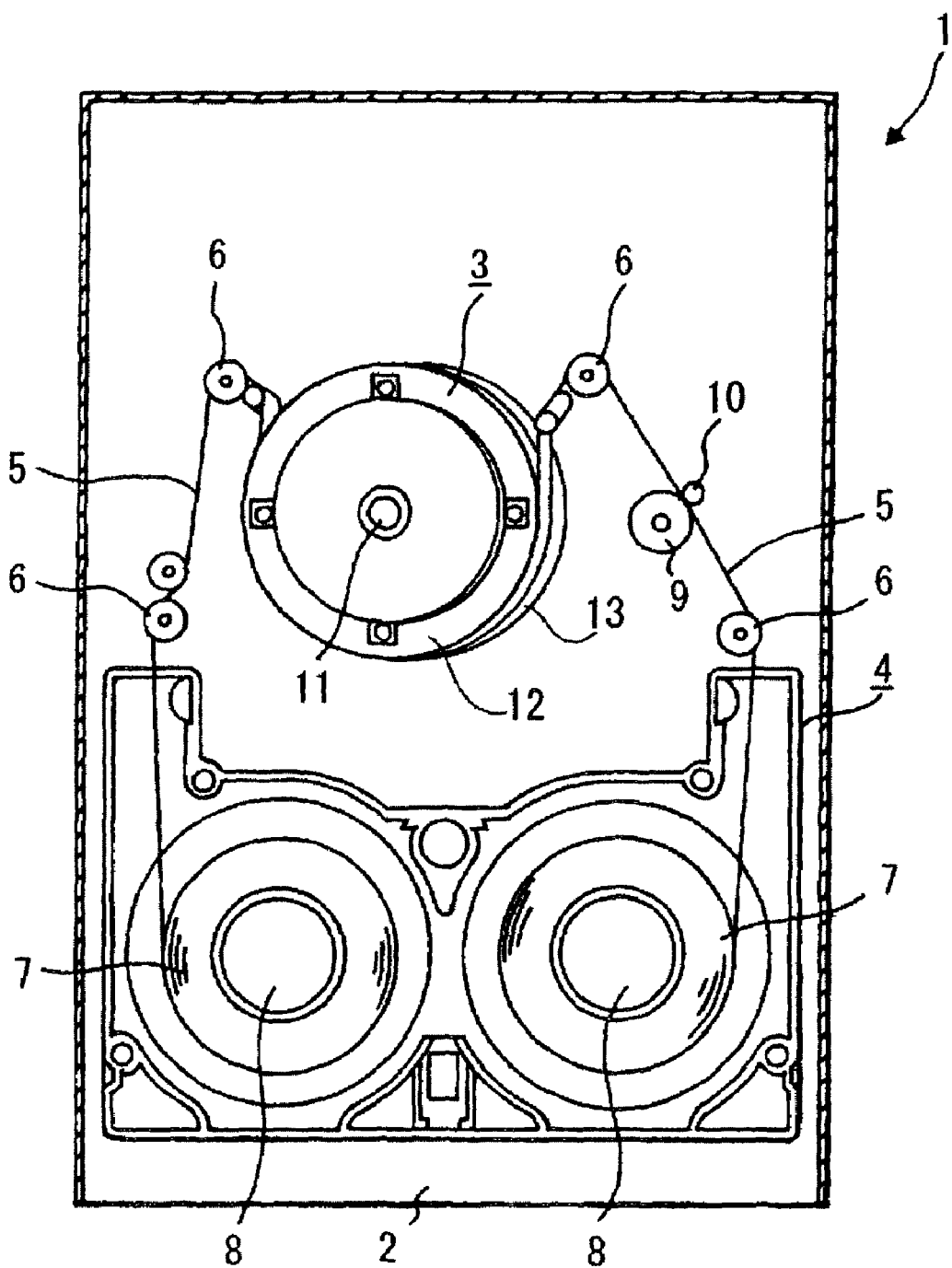
FIG. 1, showing a first embodiment of the present invention together with FIG. 2 through FIG. 15, is a schematic plan view of a magnetic tape drive unit.
Figure 2:
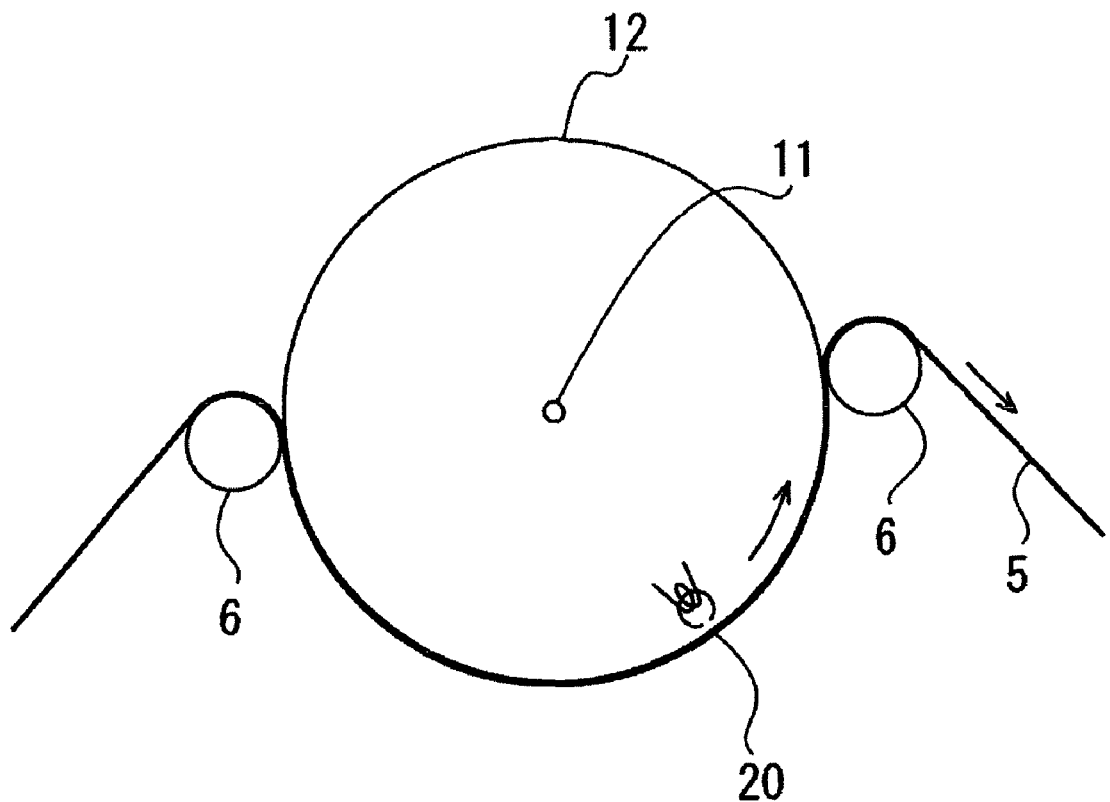
FIG. 2 is a simplified plan view of a rotary drum.

Now, embodiments of a magnetic head assembly, a magnetic tape drive unit and a magnetic disk drive unit utilizing the magnetic head assembly, according to the present invention, will be described in detail hereinafter by reference to the accompanying drawings.

FIG. 1-FIG. 15 illustrate a first embodiment of the magnetic head assembly and the magnetic tape drive unit utilizing the same, according to the present invention. The first embodiment is to apply the present invention to the magnetic tape drive unit.

Firstly, the outline of the magnetic tape drive unit will be described hereunder by reference to FIG. 1.

The main portion of the magnetic tape drive unit 1 comprises a chassis 2, a rotary drum unit 3 supported on the chassis 2, guide pins 6, 6 for pulling out a tape shaped recording medium 5 from a tape cassette 4 and forming a predetermined tape path by winding the pulled-out tape shaped recording medium 5 around the rotary drum unit 3, reel tables 8, 8 for supporting reels 7, 7 of the tape cassette 4, a capstan shaft 10 for making the tape shaped recording medium 5 to travel in cooperation with a pinch roller 9, etc. (see FIG. 1).

The rotary drum unit 3 is disposed with the axis of the rotary shaft slightly slanted with respect to the above-mentioned chassis 2.

When the tape cassette 4 is loaded in the magnetic tape drive unit 1, the tape shaped recording medium 5 is pulled out from the tape cassette 4 by the guide pins 6, 6 toward the rotary drum unit 3 and is wound around the rotary drum unit. And a tape path is established by gripping the tape shaped recording medium 5 between the pinch roller 9 and the capstan shaft 10 (see FIG. 1).

FIG. 1 schematically shows a condition when the tape path is established by loading the tape cassette 4 on the magnetic tape drive unit 1.

When the magnetic tape drive unit 1 is instructed to start recording operation, the tape path is established and the rotary drum of the rotary drum unit 3 starts rotating as described hereinafter. Simultaneously, the capstan shaft 10 starts revolving, thereby making the tape shaped recording medium 5 to travel around and in contact with the circumference of the above-mentioned rotary drum unit 3 at a constant speed. As a result, magnetic signals are recorded on the tape shaped recording medium 5 by the magnetic head assembly as described hereinafter.

It is to be noted here that "the guide pins 6, the pinch roller 9 and the capstan shaft 10" and the like constitute "means for making a tape shaped recording medium to travel along a predetermined traveling path" as recited in a claim.

The above-mentioned rotary drum unit 3 comprises a fixed shaft 11 installed on the chassis 2, a rotary drum 12 rotatably supported by the fixed shaft 11 by way of bearings (not shown) and a stationary drum 13 disposed below the rotary drum 12 and mounted on the above-mentioned chassis 2. The stationary drum 13 and the rotary drum 12 are opposed to each other with a predetermined gap. A cut-out 14 (see FIG. 3) is formed at the lower edge of the rotary drum 12 in one location along the circumference for disposing the magnetic head assembly 20 within the cut-out 14, which will be described hereinafter.

The magnetic head assembly 20 comprises a thin film magnetic recording head 21 and a pair of auxiliary members 22a, 22b which are adhered onto both sides (the leading and trailing sides) of the thin film magnetic recording head 21. It is to be noted that "a leading and/or trailing side" as recited in the claim is used to include both of the leading and trailing sides as well as either one of the leading and trailing sides.

Figure 4:
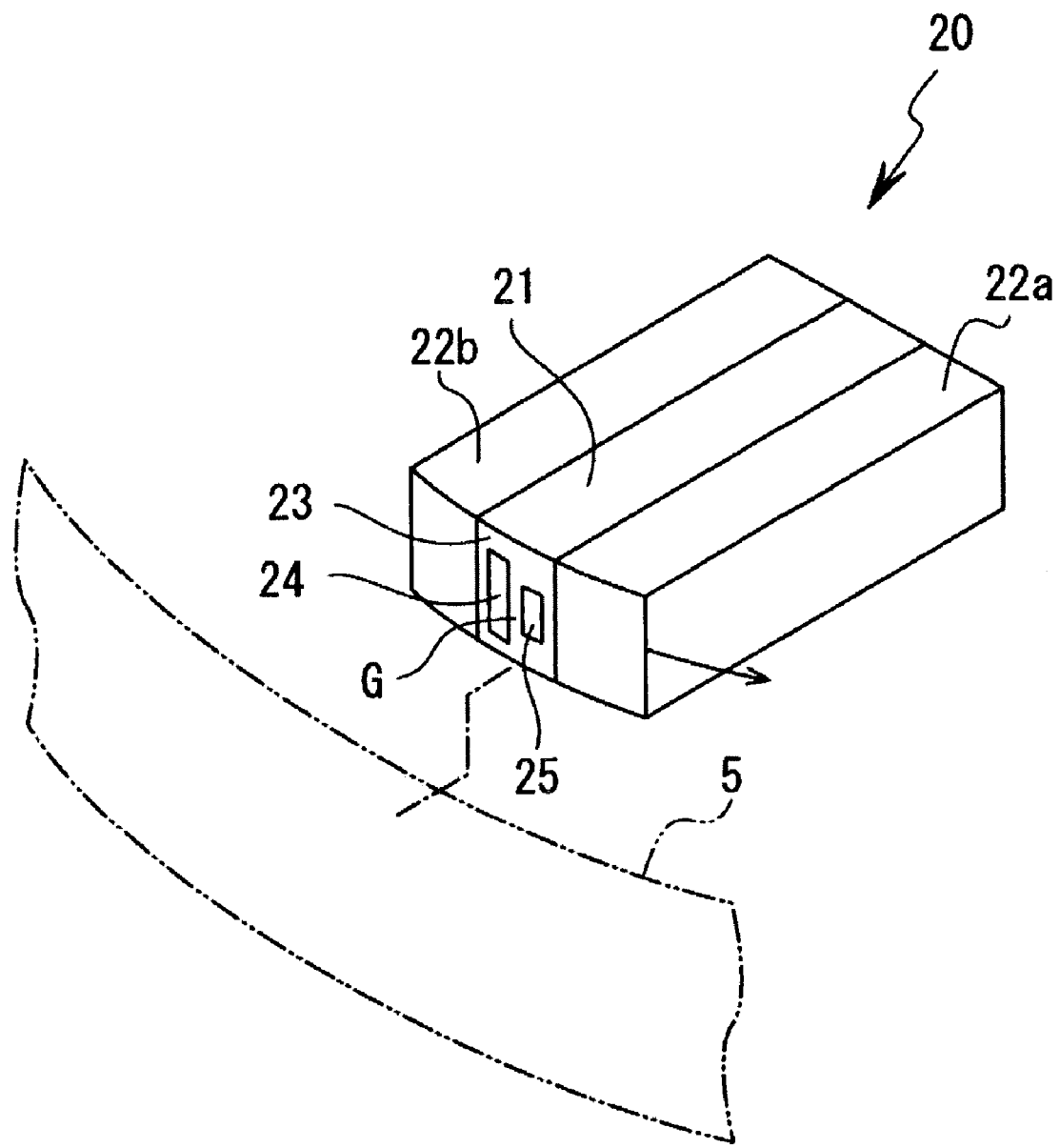
FIG. 4 is a simplified and enlarged perspective view of a magnetic head assembly.
Figure 5:
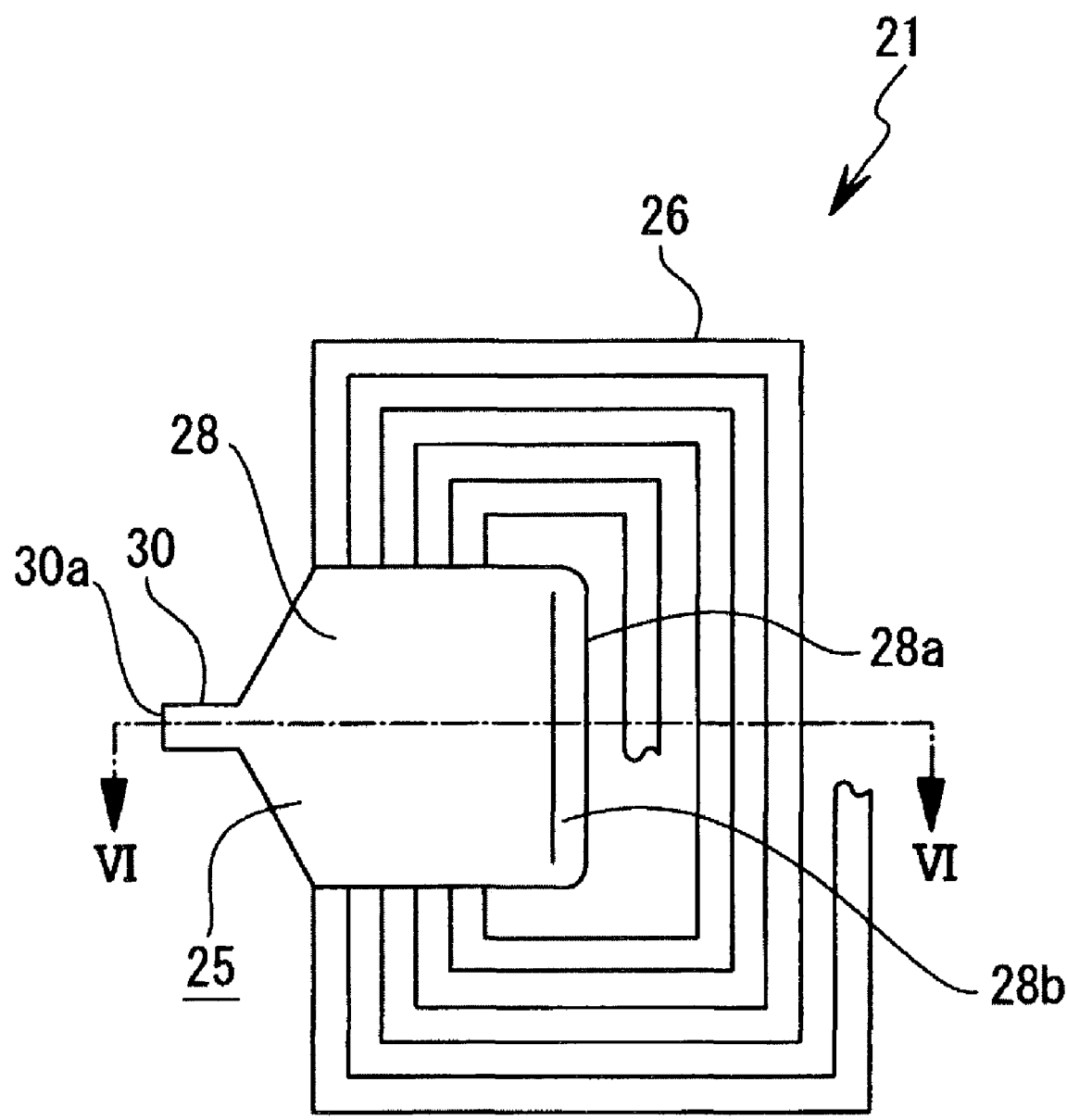
FIG. 5 is a simplified and enlarged side view of the magnetic recording head partly cut away.
Figure 6:
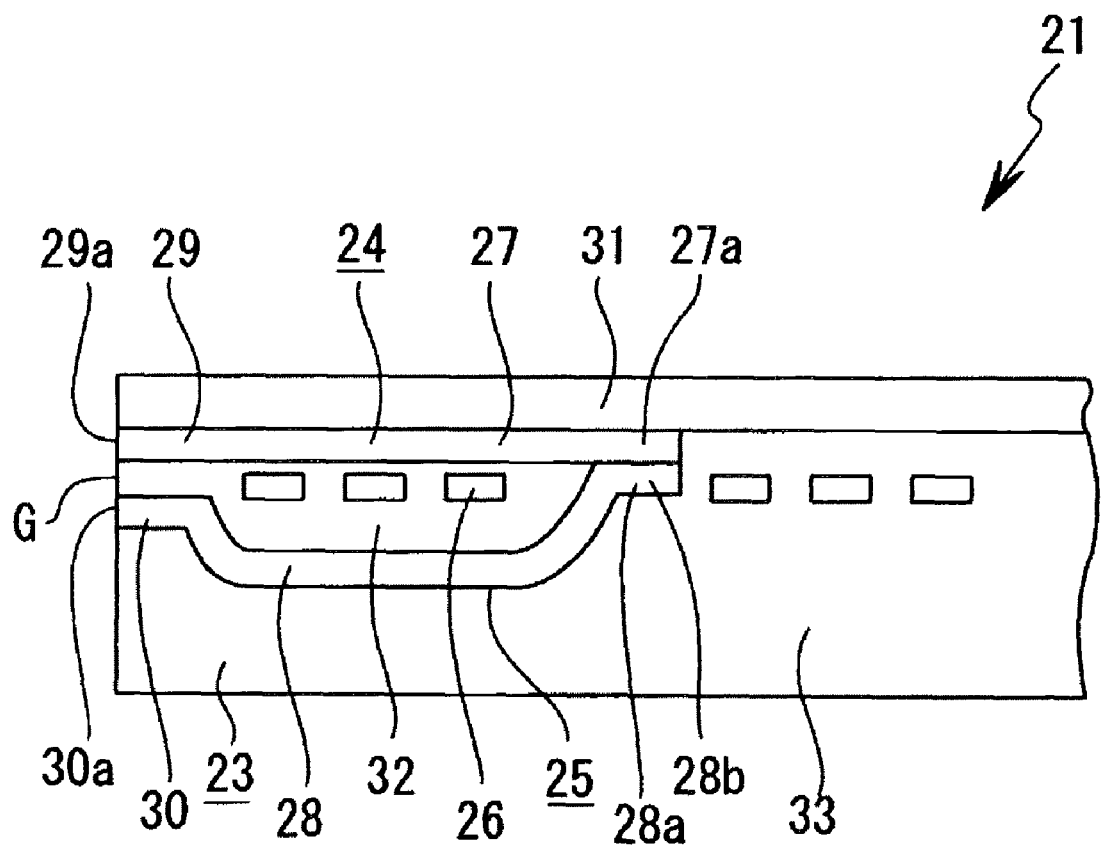
FIG. 6 is an enlarged cross section view cut along the lines VI-VI in FIG. 5.

The thin film magnetic recording head 21 includes a rectangular non-magnetic member 23 in front view, a first magnetic core 24 and a second magnetic core 25 embedded in the non-magnetic member 23 and a coil 26 for generating a magnetic flux between the front ends of the first and second magnetic cores 24, 25 (see FIG. 4 and FIG. 6).

The two magnetic cores 24, 25 are in a rectangular shape which is longer in the vertical direction in the front view. The first magnetic core 24 is made to have a slightly longer length in the front view (referred to as the "width" of the magnetic core below) than the length in the front view (referred to as the "width" of the magnetic core below) of the second magnetic core 25.

Figure 7:
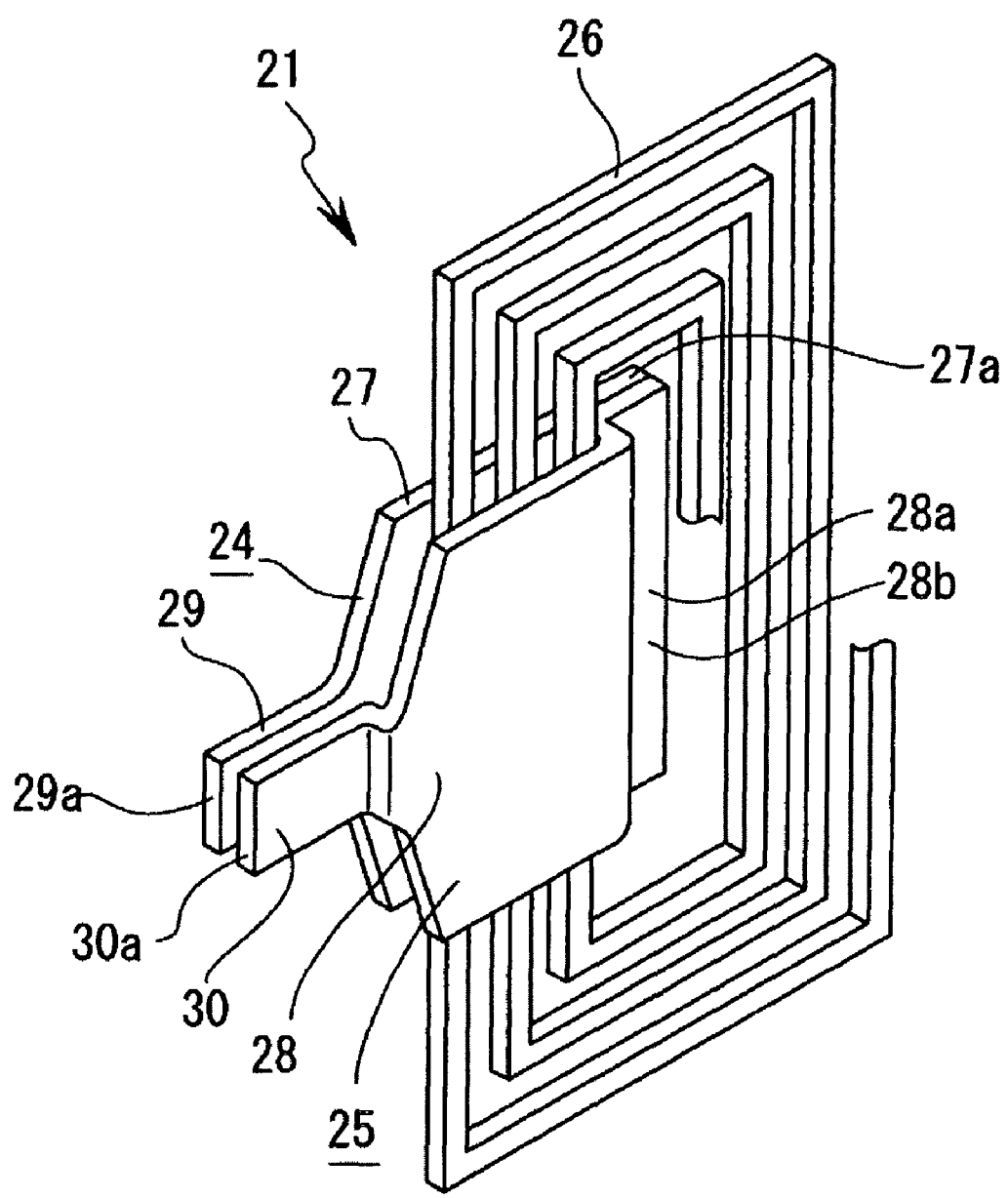
FIG. 7 is an enlarged perspective view schematically showing the magnetic recording head partly cut away.
Figure 8:
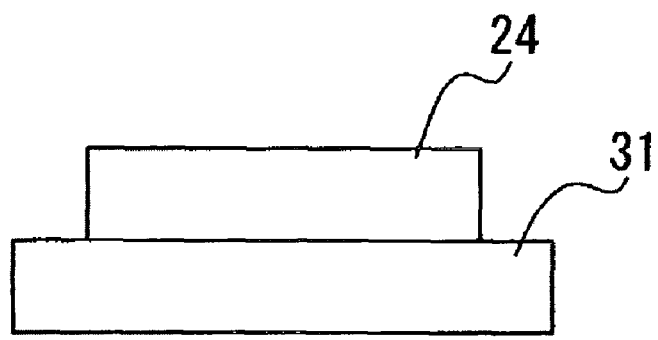
FIG. 8, illustrating fabrication steps of the magnetic recording head together with FIG. 9 through FIG. 11, is an enlarged front view showing a substrate having a first magnetic core that is formed thereon.

The first magnetic core 24 and the second magnetic core 25 have essentially the same shape in side view and each comprises a substantially pentagonal core main body 27, 28, a tongue portion 29, 30 extending forwardly from the core main body 27, 28 (see FIG. 7). Front end portions 29a, 30a of the tongue portion 29, 30 is exposed at the front of the thin film magnetic recording head 21 (see FIG. 4).

The first magnetic core 24 is formed as a substantially flat plate (see FIG. 7).

A front end portion of the core main body 28 of the second magnetic core 25 is bent toward the first magnetic core 24 from a bent end portion of which extends forwardly to form the above-mentioned tongue portion 30. On the other hand, a back end portion 28a of the core main body 28 is bent toward the first magnetic core 24 from the end portion of which extends backwardly to form a connection member 28b (see FIG. 6 and FIG. 7).

The tongue portion 30 of the second magnetic core 25 is disposed adjacent to the tongue portion 29 of the first magnetic core 24. And the connection portion 28b of the second magnetic core 25 is connected to a back end portion 27a of the core main body 27 of the first magnetic core 24 (see FIG. 6 and FIG. 7).

The above configuration forms a gap between the core main body 27 of the first magnetic core 24 and the core main body 28 of the second magnetic core 25 at the location excluding the back end portions 27a, 28a, thereby enabling to insert the above-mentioned coil 26 into the gap (see FIG. 6 and FIG. 7).

And the width of the front end face 29a of the tongue portion 29 of the first magnetic core 24 is formed slightly larger than the width of the front end face 30a of the tongue portion 30 of the second magnetic core 25 (see FIG. 7). Concrete dimensions are, for example, 1.96 μm in the width of the front end face 29a of the first magnetic core 24 and 1.54 μm in the width of the front end portion 30a of the second magnetic core 25.

On the other hand, the front end face 29a of the tongue portion 29 of the first magnetic core 24 and the front end face 30a of the tongue portion 30 of the second magnetic core 25 are disposed to provide a predetermined gap (referred to as the "magnetic gap" below) G via the above-mentioned non-magnetic member 23 (see FIG. 4).

The back end portion 27a of the core main body 27 of the first magnetic core 24 and the connection portion 28b of the core main body 28 of the second magnetic core 25 are connected together within the non-magnetic member 23. The coil 26 is formed to be wound around the back end portions 27a, 28a through the gap between the core main body 27 of the first magnetic core 24 and the core main body 28 of the second magnetic core 25 (see FIG. 6 and FIG. 7).

The thin film magnetic recording head 21 having the above configuration is fabricated in the following manner. It is to be noted in the following descriptions of the fabrication steps that a reference orientation is the direction in which the front end faces 29a, 30a of the magnetic cores 24, 25 are seen to be horizontally elongated in front view (see FIG. 8-FIG. 11).

Firstly, the first magnetic core 24 made from a soft magnetic material is formed on a substrate 31 made from non-magnetic material. In front view, the width of the front end face 29a of the first magnetic core 24 is made shorter than the width of the front end face of the substrate 31 (see FIG. 8). It is to be noted that the substrate 31 is a part of the above-mentioned non-magnetic member 23.

Figure 9:
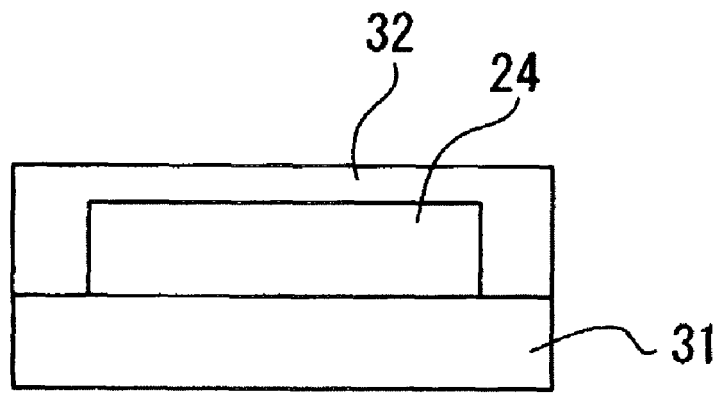
FIG. 9 is an enlarged front view to show the step subsequent to FIG. 8, wherein a non-magnetic film is formed on the first magnetic core and adjacent right and left end portions thereof.

A non-magnetic film 32 is, then, formed on the first magnetic core 24 and the both right and left portions adjacent to the first magnetic core 24 (see FIG. 9). It is to be noted that the non-magnetic film 32 is a part of the above-mentioned non-magnetic member 23. Although not shown, forming of the above-mentioned non-magnetic film 32 is made in the following two steps and the above-mentioned coil 26 is fabricated during the time interval between the two steps. That is, after forming the first magnetic core 24, the non-magnetic film 32 is formed to a predetermined thickness. Subsequently, the coil 26 is formed on the non-magnetic film 32 and the non-magnetic film 32 is formed again in such a manner to cover the coil 26. It is to be noted at this time that the non-magnetic film 32 is not formed on the back end face 27a of the first magnetic core 24.

Figure 10:
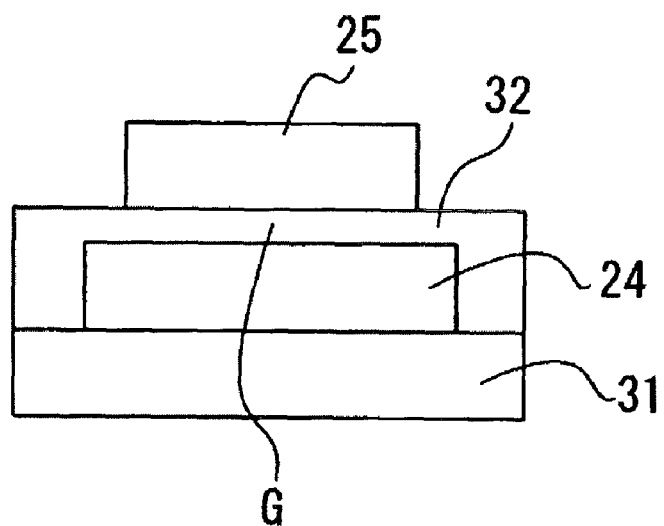
FIG. 10 is an enlarged front view to show the step subsequent to FIG. 9, wherein the second magnetic core is formed on the non-magnetic film.

Then, the second magnetic core 25 made from a soft magnetic material is formed on the non-magnetic film 32 at a location opposed to the first magnetic core 24 (see FIG. 10). Since no non-magnetic film 32 is formed on the back end portion 27a of the first magnetic core 24, the connection portion 28b of the second magnetic core 25 and the back end portion 27a of the first magnetic core 25 are in contact with each other (see FIG. 6).

The width of the front end face 30a of the second magnetic core 25 is formed slightly smaller than the width of the front end face 29a of the first magnetic core 24 as described hereinabove.

And the magnetic gap G is formed between the front end face 30a of the second magnetic core 25 and the front end face 29a of the first magnetic core 24.

Figure 11:
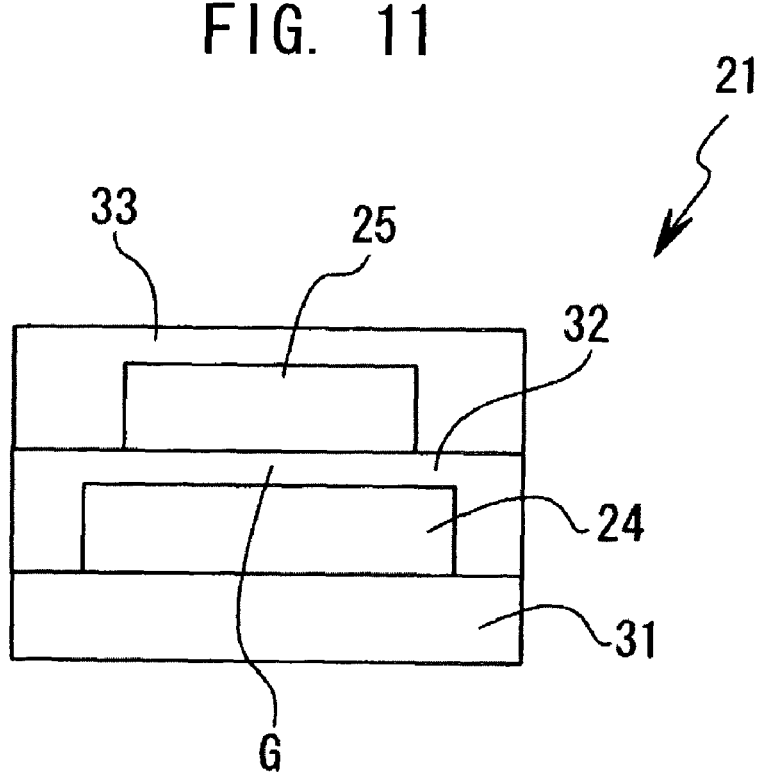
FIG. 11 is an enlarged front view to show the step subsequent to FIG. 10, wherein the non-magnetic film is formed on the second magnetic core and the adjacent right and left end portions thereof.

Finally, a non-magnetic film 33 is formed on the second magnetic core 25 and the both right and left portions adjacent to the second magnetic core 25 (see FIG. 11). It is to be noted that the non-magnetic film 33 is a part of the above-mentioned non-magnetic member 23.

Suitable materials for the substrate 31 and the non-magnetic films 32, 33 include, for example, AlTiC and alumina ($Al_2O_3$).

The substrate 31 and the non-magnetic films 32, 33 are formed from the same material, thereby making them integrated to have no boundary between them (see FIG. 4) and forming the above-mentioned non-magnetic member 23.

Suitable materials for the first magnetic core 24 and the second magnetic core 25 include, for example, permalloy (Ni—Fe), sendust (Si—Al—Fe), amorphous iron core material (high permeability thin belt) and the like.

The width of the front end face 29a of the first magnetic core 24 is made larger than the width of the front end face 30a of the second magnetic core 25. Since the second magnetic core 25 having the front end face 30a narrower than the width of the front end face 29a of the first magnetic core 24 is formed on the first magnetic core 24 as the base, it is easy to form the front end face 30a of the second magnetic core 25 in any desired shape, i.e., in a horizontally elongated rectangle.

The magnetic head assembly 20 is made by adhering the auxiliary members 22a, 22b on the both side faces in the stacking direction of the thin film magnetic recording head 21 having the substrate 31, the first magnetic core 24, the non-magnetic film 32, the second magnetic core 25 and the non-magnetic film 33 as fabricated in the above steps, i.e., one on the substrate 31 and the other on the non-magnetic film 33.

The auxiliary members 22a, 22b are preferably made from non-magnetic material, such as AlTiC, alumina ($Al_2O_3$).

The auxiliary members 22a, 22b are positioned to have their front end faces flush with the front end face of the thin film magnetic recording head 21 and the surface defined by the front end faces of these three members is made to be a convex surface in which the thin film magnetic recording head 21 is forwardly projecting by small amount (see FIG. 4).

Figure 3:
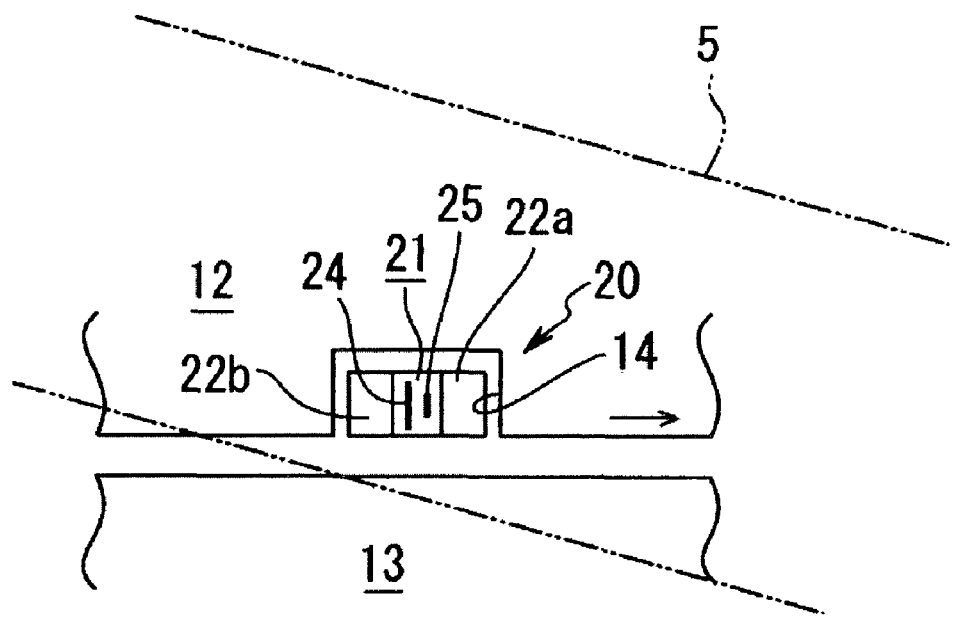
FIG. 3 is a front view to schematically show relationship between a magnetic recording head and a tape shaped recording medium.

The magnetic head assembly 20 as fabricated according to the above steps and-configuration is disposed against the tape shaped recording medium 5 in such manner that the second magnetic core (the narrower magnetic core) 25 is positioned at the leading side (see FIG. 3 and FIG. 4).

Normally, the rotary drum 12 rotates in the same direction as the traveling of the tape shaped recording medium 5 in the magnetic tape drive unit 1. However, since the rotating speed of the rotary drum 12 is significantly faster than the traveling speed of the tape shaped recording medium 5, only the direction of rotating the rotary drum 12, i.e., the traveling direction of the magnetic head assembly 20 is indicated by an arrow for convenience of description (see FIG. 3 and FIG. 4).

As described hereinabove, if the magnetic head assembly 20 is disposed in the orientation that the second magnetic core 25 is positioned in the leading side of the tape shaped recording medium 5, the tape shaped recording medium 5 is in contact with the first magnetic core 24 after contacting the second magnetic core 25 having a relatively narrower width, thereby effectively avoiding the above-mentioned recording magnetic flux fringing problem.

Figure 27:
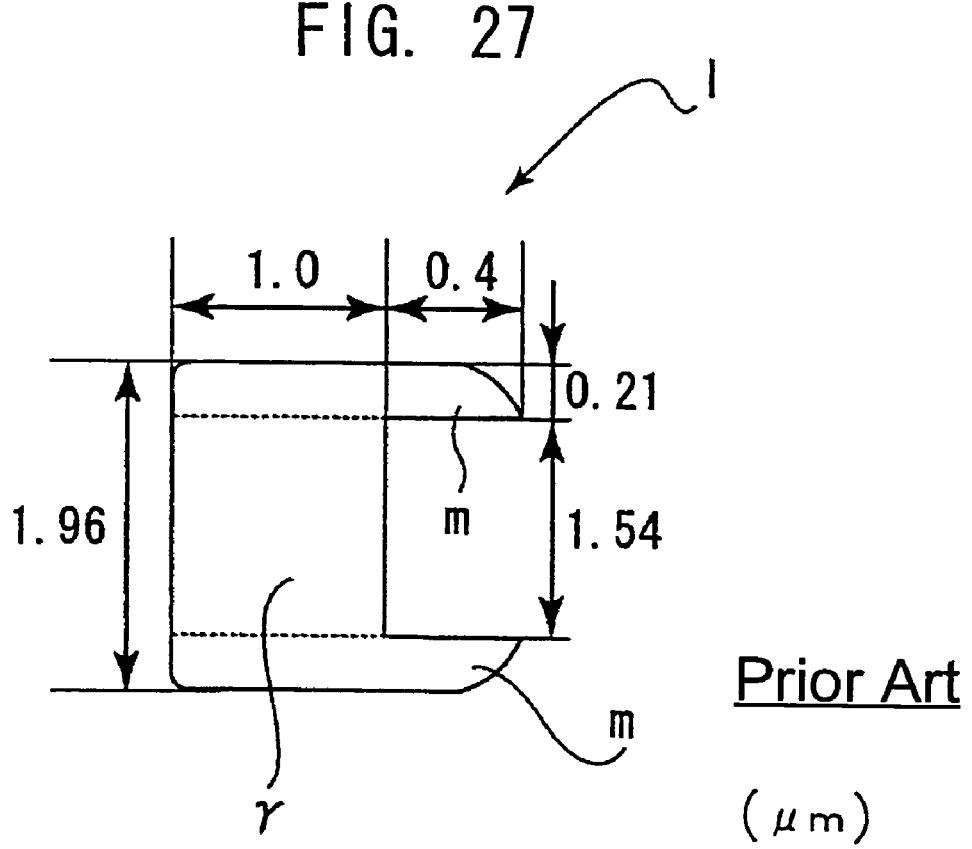
FIG. 27 schematically illustrates in a magnified form a single bit recording pattern as recorded by a conventional magnetic head assembly.
Figure 28:
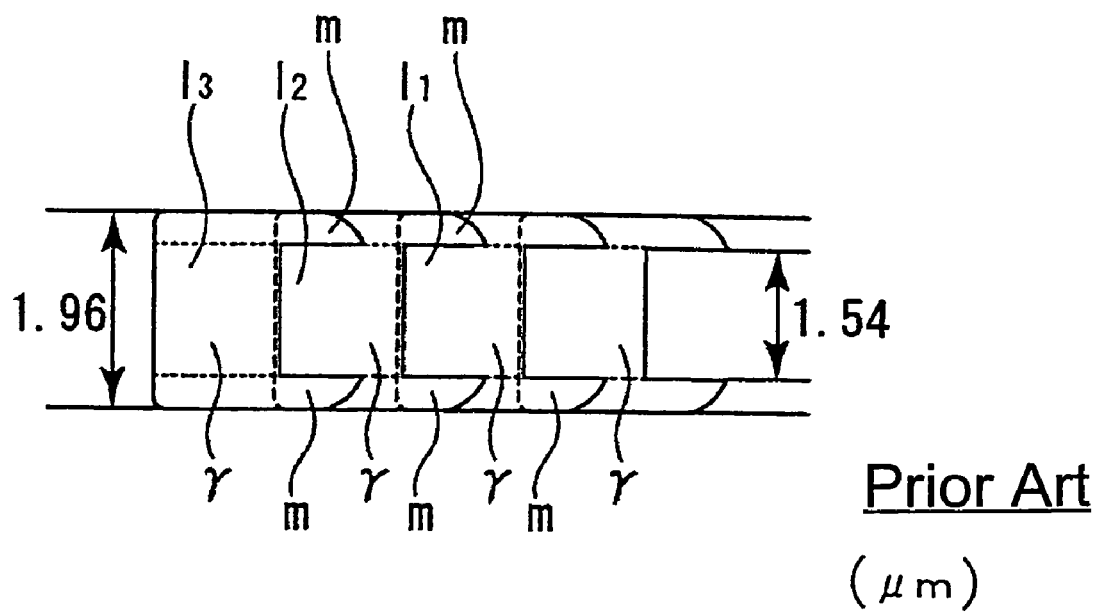
FIG. 28 schematically illustrates in a magnified form a recording pattern of recording plural bits by the conventional magnetic head assembly.
Figure 29:
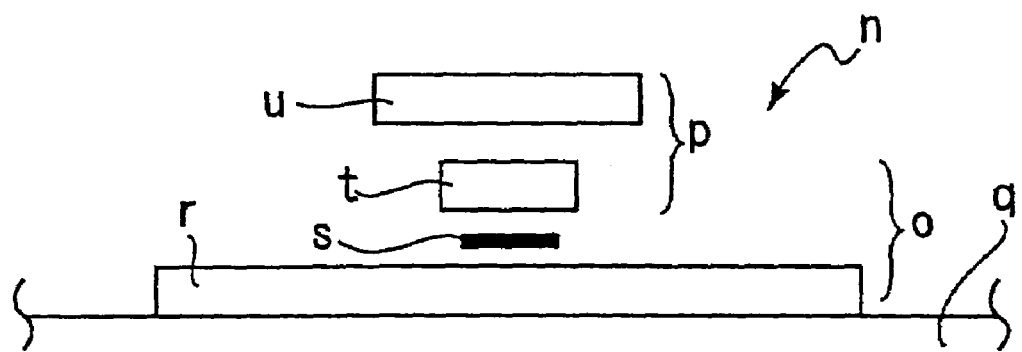
FIG. 29 schematically illustrates the conventional magnetic head assembly for preventing recording magnetic flux fringing.
Figure 30:
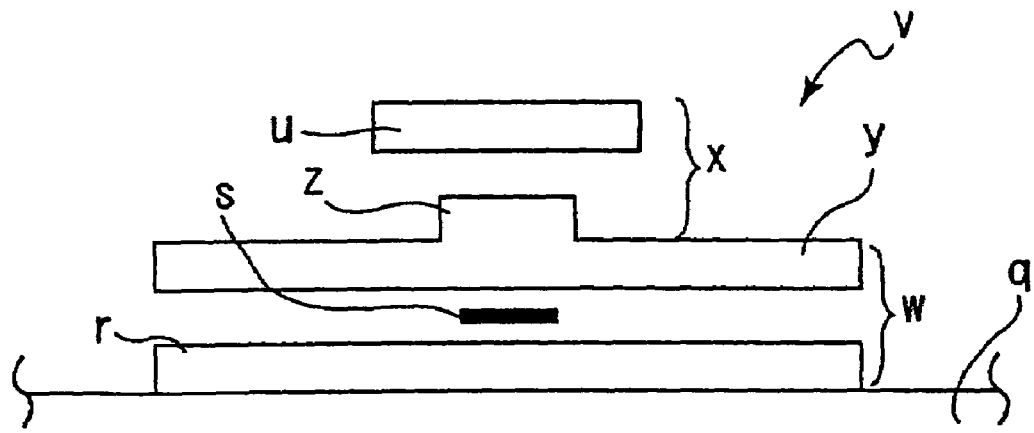
FIG. 30 schematically illustrates another conventional magnetic head assembly for preventing recording magnetic flux fringing.

In other words, since the width of the leading side magnetic core (the second magnetic core 25) is smaller than the width of the trailing side magnetic core (the first magnetic core 24), it is possible to record again the recording pattern that is recorded by the leakage magnetic flux developed at both end portions in the width direction of the second magnetic core 25 by the leakage magnetic fluxes developed at the edge portion closer to the magnetic gap G of the trailing side magnetic core (the first magnetic core 24). Accordingly, there arises essentially no band portions (m, m) that occurred in the conventional recording pattern "l" (see FIG. 27), thereby overcoming the so-called side erase problem in which both side portions of the already recorded recording pattern are overwritten by a part of the next subsequently recording pattern.

Figure 12:
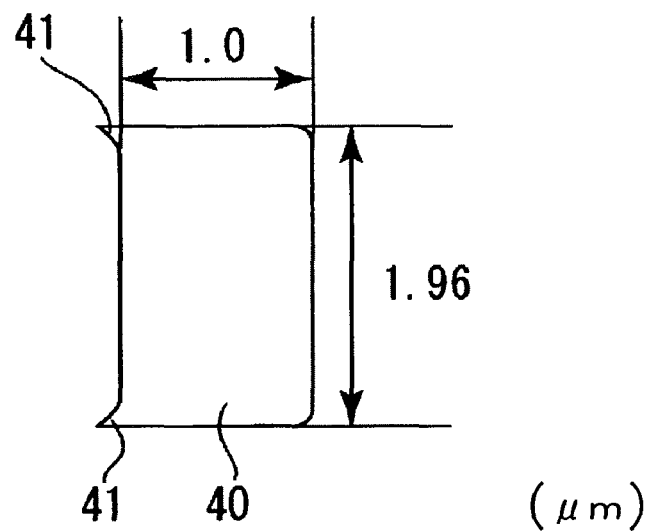
FIG. 12 is a conceptual view illustrating a single bit recording pattern in a magnified form.

FIG. 12 schematically illustrates a single bit recording pattern 40 as recorded on the tape shaped recording medium 5 using the thin film recording head 21 according to the first embodiment of the present invention. It is apparent that the pattern 40 has essentially no band portions (m, m) at both side portions in the width direction of the track as described hereinabove regarding the prior art.

Figure 13:
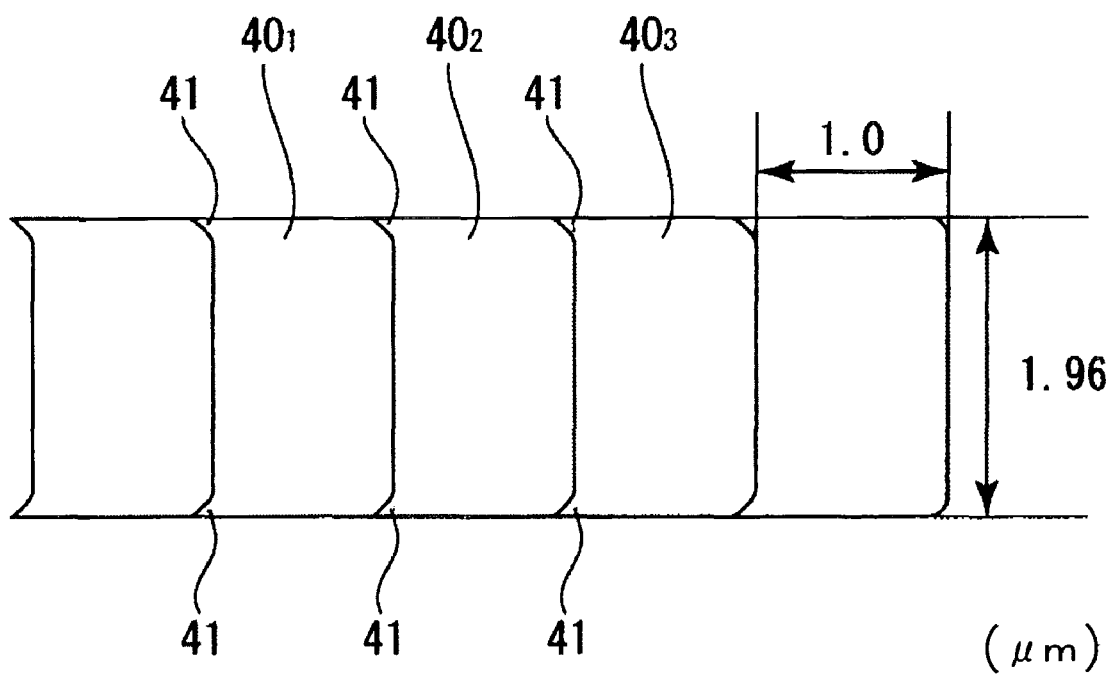
FIG. 13 is a conceptual view illustrating plural bits of recording pattern in a magnified form.

As a result, even if plural bits of such recording patterns 40 may be formed, there is essentially no possibility of overwriting parts of both sides of the already recorded recording patterns $40_1$ by the next subsequent recording pattern $40_2$, thereby avoiding the so-called side erase problem (see FIG. 13).

Also, when the magnetic head assembly 20 is going to contact with the tape shaped recording medium 5, the tape shaped recording medium 5 first contacts with the auxiliary member 22a locating at the leading portion of the magnetic head assembly 20 (see FIG. 3 and FIG. 4). This helps, to improve hitting of the thin film magnetic recording head 21 by the tape shaped magnetic recording medium 5.

In other words, the tape shaped recording medium 5 travels over the rotary drum unit 3 with a condition slightly floating from the drum surface. When traveling through the cut-out portion 14, the tape shaped recording medium 5 tends to thrash due to air turbulence. If the thrashing tape shaped recording medium 5 contacts with the thin film magnetic recording head 21, shock is applied to the films (i.e., the substrate 31, the first magnetic core 24, the second magnetic core 25, etc.) constituting the thin film magnetic recording head 21.

However, if the tape shaped recording medium 5 may contact with the auxiliary member 22a at the leading side prior to contacting with the thin film magnetic recording head 21, such thrashing of the tape shaped recording medium 5 is suppressed by the contact with the auxiliary member 22a. As a result, it is possible that the thin film magnetic recording head 21 is brought into contact with the tape shaped recording medium 5 in the stabilized condition.

As described above, the auxiliary member 22a that comes in contact with the tape shaped recording medium 5 prior to the thin film magnetic recording head 21 acts as a guide for the tape shaped recording medium 5.

Additionally, according to the above-mentioned first embodiment of the present invention, the auxiliary member 22b is provided at the trailing side of the thin film magnetic recording head 21, thereby solving a problem that the films (the substrate 31, the first magnetic core 24, the second magnetic core 25, etc.) are peeled off.

In other words, the films (the substrate 31, the first magnetic core 24, the second magnetic core 25, etc.) formed through the thin film fabrication process have relatively weak bonding force between films, thereby being peeled off relatively easily if an external force is applied in the direction of peeling.

The auxiliary member 22b provided at the trailing side of the thin film magnetic recording head 21 receives any force to be applied to the films (the substrate 31, the first magnetic core 24, the second magnetic core 25, etc.) in the direction of peeling, thereby preventing the films from being peeled off.

In a case of the disk shaped recording medium (b) traveling in non-contacting relationship with the thin film magnetic recording head (a) such as the hard disk drive unit that is exemplified hereinabove in the prior art, there is essentially no instance when the both members contact to each other, thereby arising no peeling problem of the films constituting the thin film magnetic recording head (a). In a case of the tape shaped recording medium 5 traveling in the contacted condition with the thin film magnetic recording head 21, there may encounter the peeling problem of the films constituting the thin film magnetic recording head 21. However, the magnetic tape drive unit 1 according to the first embodiment of the present invention can solve the peeling problem of the films.

Additionally, since the auxiliary member 22a at the leading side can suppress thrashing of the tape shaped recording medium 5, it helps to resist peeling off the films (the substrate 31, the first magnetic core 24, the second magnetic core 25, etc.).

In other words, since the auxiliary member 22a at the leading side suppresses thrashing of the tape type magnetic medium 5 so as to contact the thin film magnetic recording head 21 in the stabilized condition, it helps to relief any force to be applied to the films (the substrate 31, the first magnetic core 24, the second magnetic core 25, etc.) in the peeling direction thereof when the tape shaped recording medium 5 is brought into contact with the thin film magnetic recording head 21.

Figure 14:
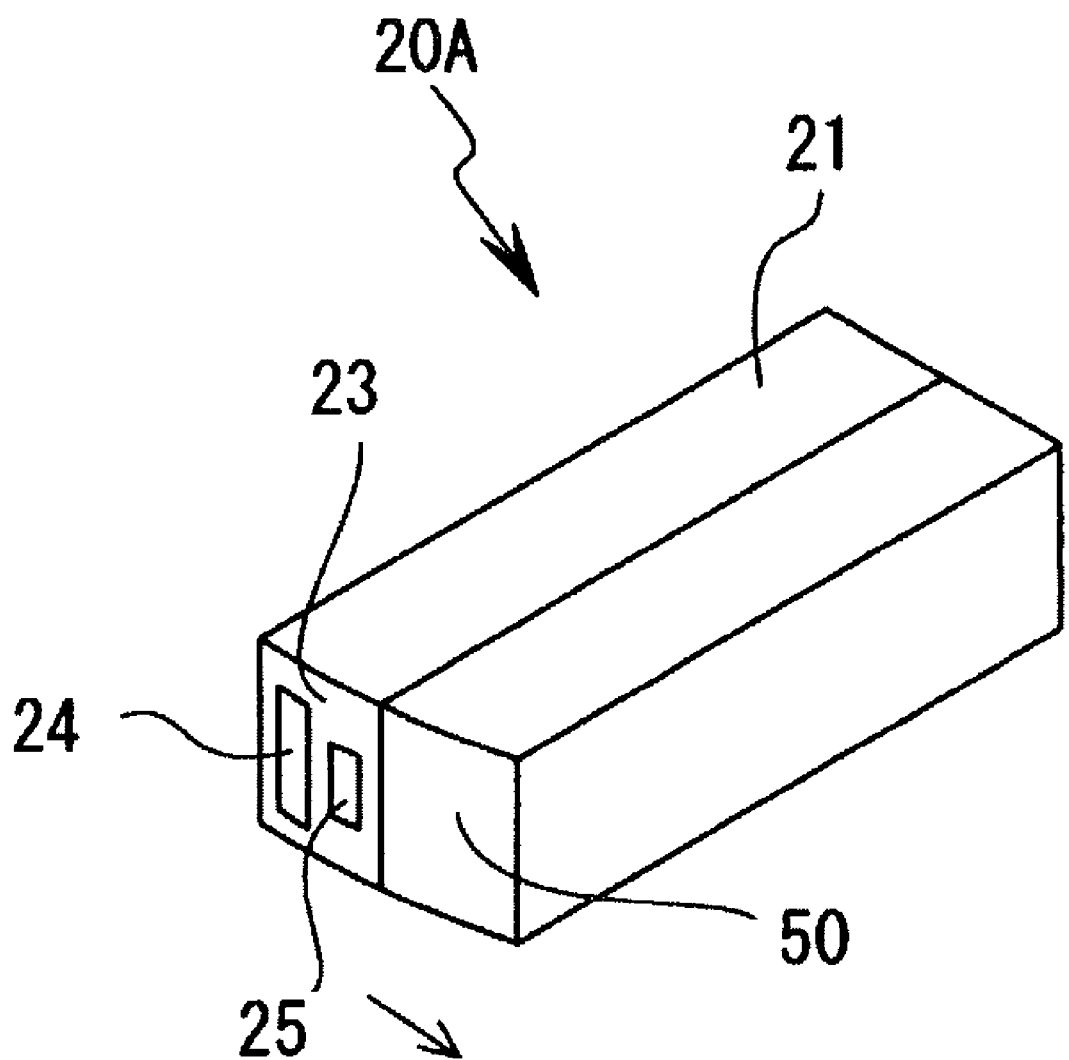
FIG. 14 is a simplified and enlarged perspective view of a modified example of the magnetic head assembly.

FIG. 14 shows a modified embodiment of the magnetic head assembly 20. Difference of a magnetic head assembly 20A of the present modified embodiment from the above-described magnetic head assembly 20 is the use of a single auxiliary member which is adhered onto either the leading or the trailing side of the thin film magnetic recording head.

In the magnetic head assembly 20A, an auxiliary member 50 is adhered to only the leading side of the thin film magnetic recording head 21.

Even in the modified embodiment of the magnetic head assembly 20A, since the auxiliary member 50 is adhered to the leading side of the thin film recording head 21, it helps to stabilize the tape shaped recording medium 5 before contacting with the thin film magnetic recording head 21, thereby enabling the auxiliary member 50 to function as a guide.

Also, since the auxiliary member 50 adhered onto the leading side of the thin film magnetic recording head 21 suppresses thrashing of the tape shaped recording medium, it helps to relief any force to be applied to the films (the substrate 31, the first magnetic core 24, the second magnetic core 25, etc.) in the peeling direction thereof.

Figure 15:
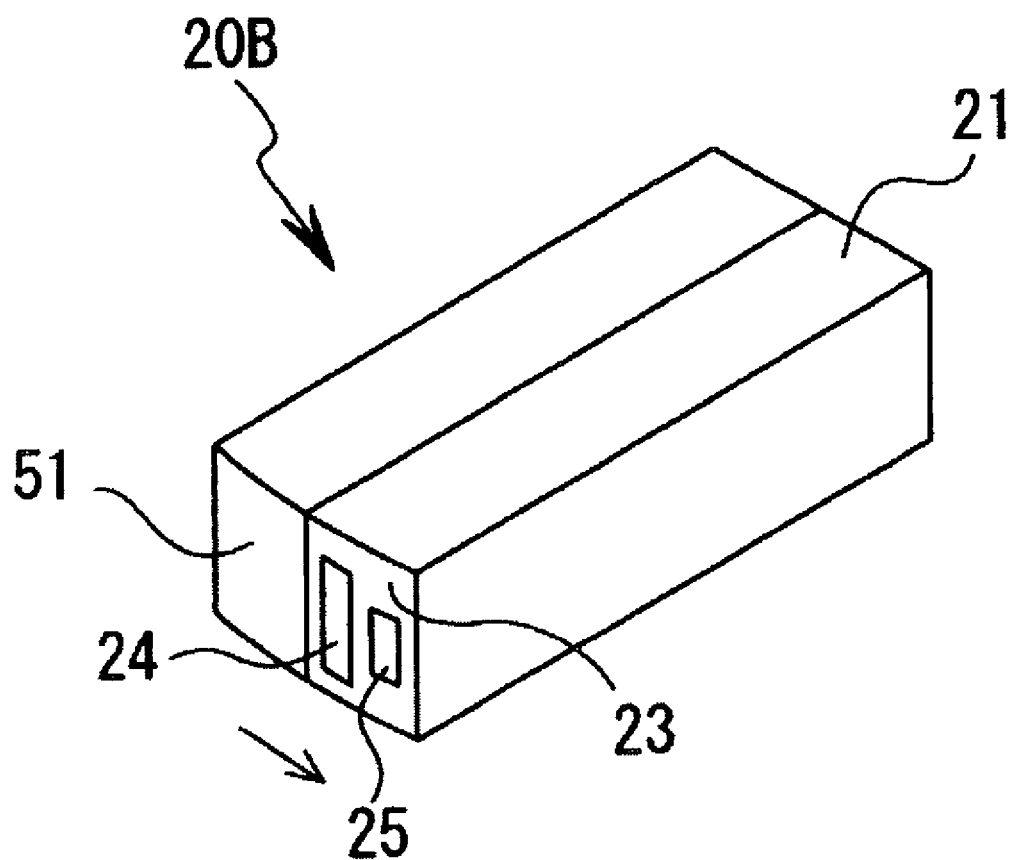
FIG. 15 is a simplified and enlarged perspective view of another modified example of the magnetic head assembly.

FIG. 15 shows still another modified embodiment of the magnetic head assembly 20. Comparing a magnetic head assembly 20B with the above-mentioned modified magnetic head assembly 20A shows, they are identical in that the auxiliary member is disposed on one side of the traveling direction of the magnetic head assembly but differ in that the auxiliary member is disposed at the trailing side of the thin film magnetic recording head in the magnetic head assembly 20B.

In other words, the magnetic head assembly 20B features in that an auxiliary member 51 is adhered onto only the trailing side of the thin film magnetic recording head 21.

Again, in the other modified example of the magnetic recording head assembly 20B, the force created by the sliding contact with the tape shaped recording medium 5 may act in the peeling direction to the films constituting the thin film magnetic recording head 21. However, the auxiliary member 51 adhered onto the trailing side of the thin film magnetic recording head 21 catches the force in the peeling direction of the films, thereby effectively preventing the films from being peeled off.

Figure 16:
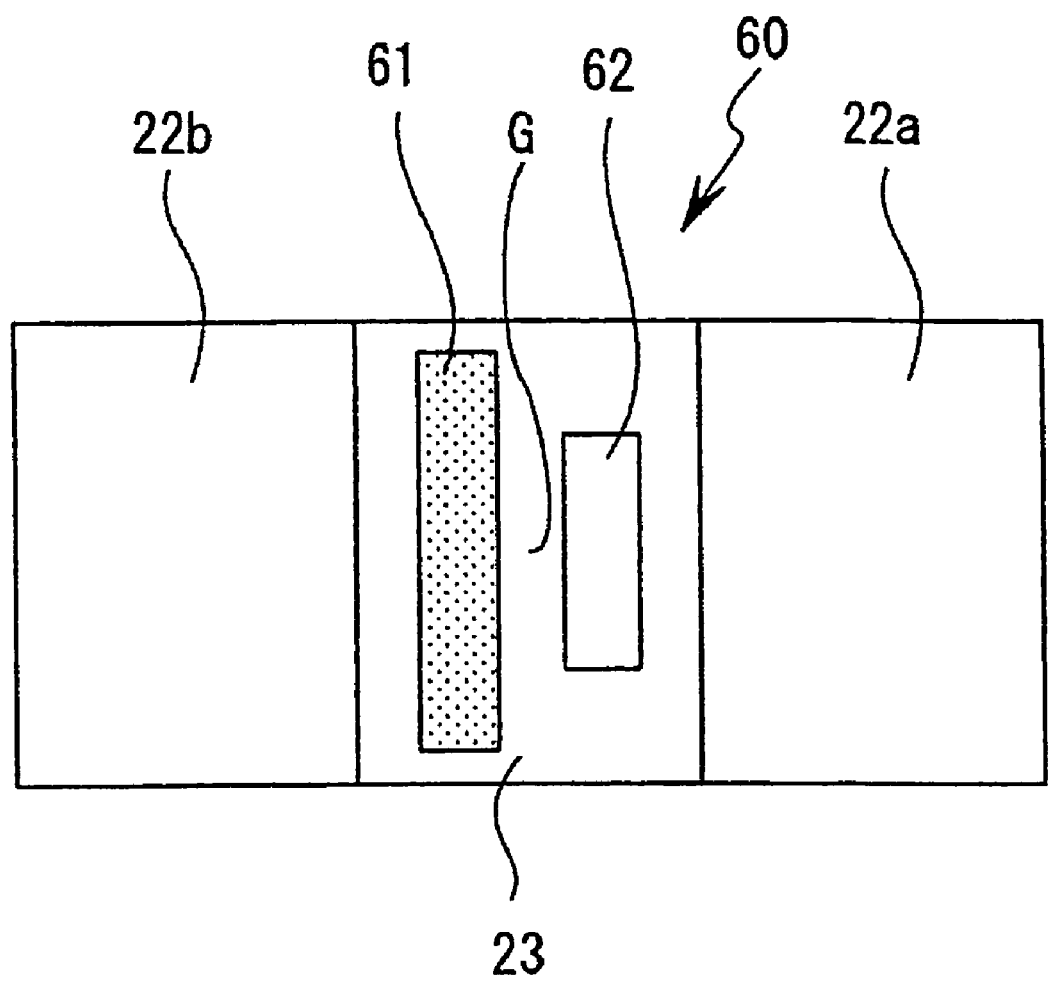
FIG. 16 is an enlarged front view of a magnetic recording head according to a second embodiment of the present invention.

Now, FIG. 16 shows the magnetic recording head assembly according to a second embodiment of the present invention. A magnetic head assembly 60 according to the second embodiment differs from the magnetic head assembly 20 according to the first embodiment in that materials of the two magnetic cores differ from each other.

A first magnetic core 61 of the magnetic head assembly 60 according to the second embodiment is made from a material having a larger saturation magnetic flux density than a second magnetic core 62.

Concretely, the material for the first magnetic core 61 is a Ni—Fe alloy with increased Fe composition or amorphous materials such as CoTaZr, CoNbZr, etc. while that for the second magnetic core 62 is permalloy (Ni—Fe), sendust (Si—Al—Fe), amorphous magnetic core material, etc.

In the magnetic head assembly 60 having the above configuration, a magnetic flux exiting from the second magnetic core 62 is largely absorbed in the first magnetic core 61 made of a material having larger saturation magnetic flux density than that of the second magnetic core 62. As a result, the leakage magnetic flux at the edge portion at the side closer to the magnetic gap G of the first magnetic core 61 makes thrashing in orientation of the leakage magnetic flux at the both side portions in the track width direction in better condition, thereby further decreasing the recording pattern at the portions extending backwardly of the both side portions 41, 41 in the track width direction and thus avoiding degradation in the S/N ratio.

Figure 17:
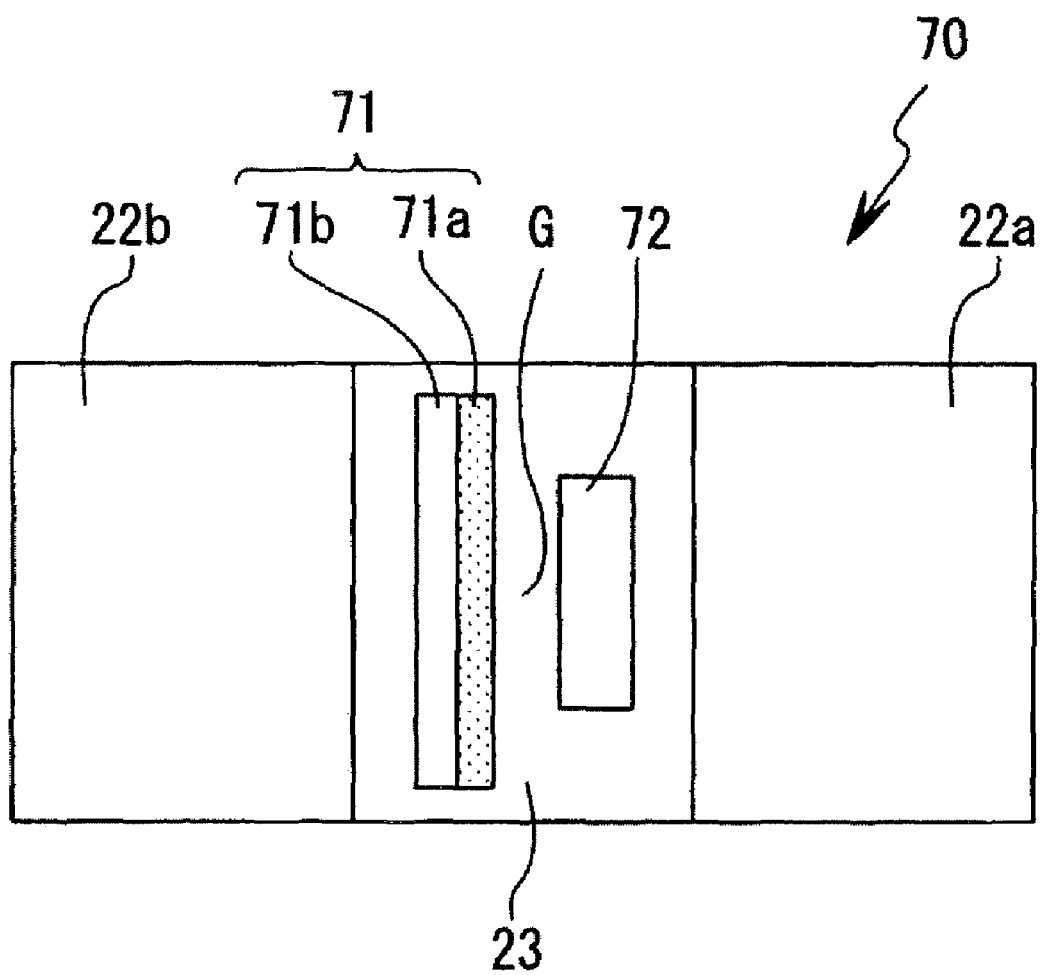
FIG. 17 is an enlarged front view of a magnetic recording head according to a third embodiment of the present invention.

Now, FIG. 17 shows a magnetic head assembly according to a third embodiment of the present invention. A magnetic head assembly 70 according to the third embodiment of the present invention differs from the above-mentioned magnetic head assembly 20 according to the first embodiment of the present invention in that the first magnetic core is made from two materials.

A first magnetic core 71 of the magnetic head assembly 70 according to the third embodiment comprises layer films 71a and 71b that are made from different materials from each other.

That is, the layer film 71a closer to the magnetic gap G of the two layer films consisting of the first magnetic core 71 is made of a material having a larger saturation magnetic flux density than the other layer film 71b.

Concretely, for example, the layer film 71a closer to the magnetic gap G of the first magnetic core 71 is made of such material as Ni—Fe alloy with increased Fe composition or amorphous material of CoTaZr, CoNbZr, or the like, while the other layer film 71b and the second magnetic core 72 are made of such material as permalloy (Ni—Fe), sendust (Si—Al—Fe), amorphous magnetic core, etc.

According to the magnetic head assembly 70 having the above configuration, a magnetic flux exiting from the second magnetic core 72 is largely absorbed in the layer film 71a closer to the magnetic gap G made of a material having a larger saturation magnetic flux density than that of the second magnetic core 72 and the other layer film 71a. As a result, the leakage magnetic flux at the edge portions closer to the magnetic gap G of the layer film 71a disposed at the position closer to the magnetic gap G of the first magnetic core 71 is improved in thrashing in orientation of the leakage magnetic flux at both side portions in the track width direction. Accordingly, the portions extending backward of the both side portions 41, 41 in the track width direction is further decreased in the recording pattern 40 and thus effectively preventing degradation in the S/N ratio.

Although an expensive material such as cobalt (Co) is used in the layer film 71a closer to the magnetic gap G of the first magnetic core 71, it is not required to make the entire part of the first magnetic core 71 with such expensive material. Accordingly, degradation in the S/N ratio can be prevented similar to the second embodiment without increasing the production cost.

Figure 18:
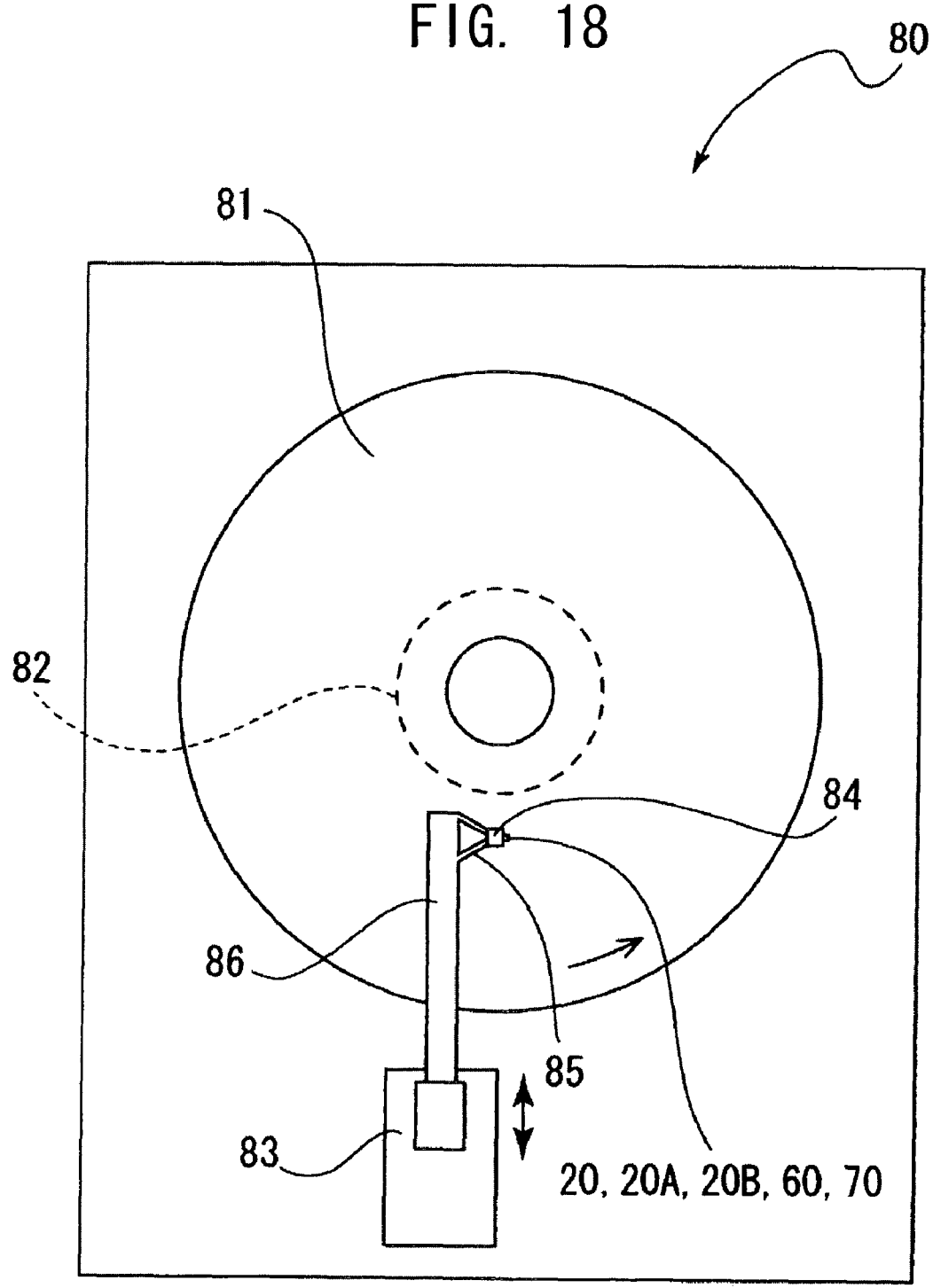
FIG. 18 is a plan view to schematically show the magnetic disk drive unit.
Figure 19:
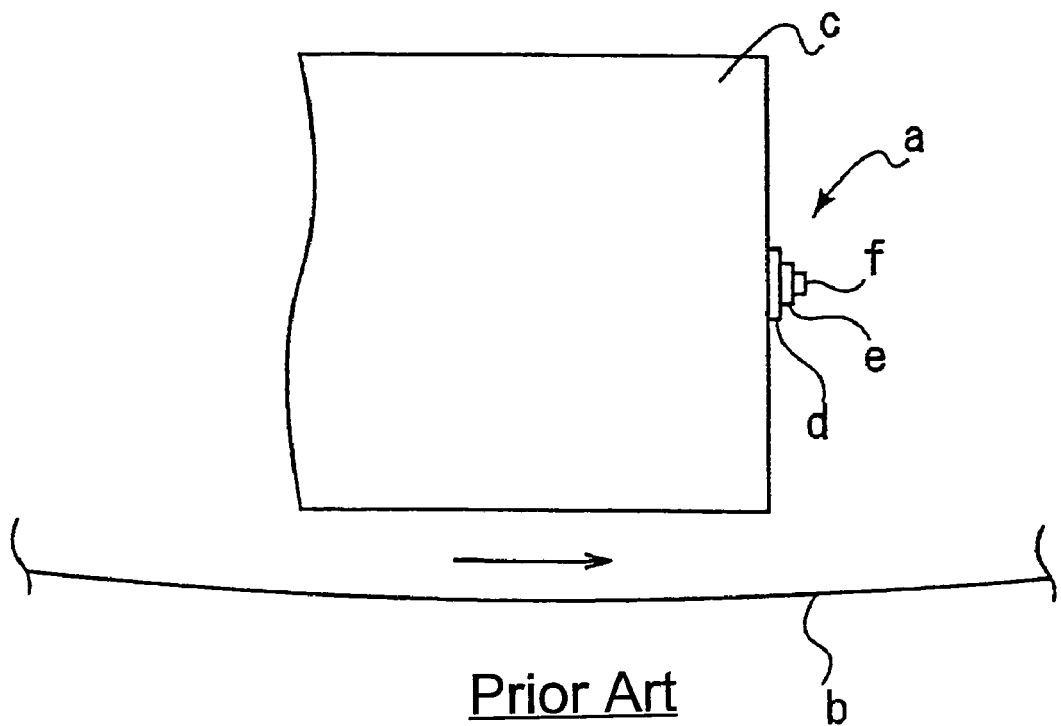
FIG. 19, illustrating the magnetic recording head in a conventional hard disk drive unit together with FIG. 20, is an enlarged plan view.
Figure 20:
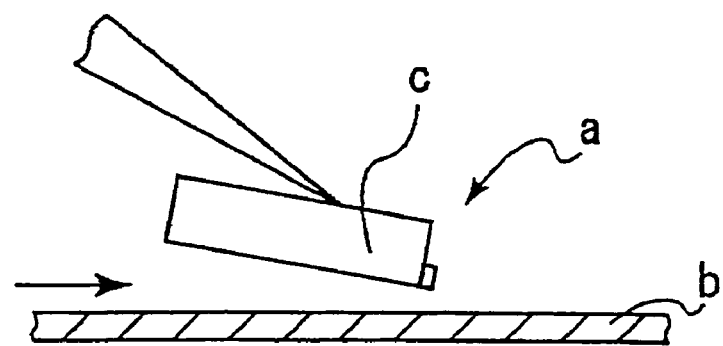
FIG. 20 is an enlarged side view of the conventional hard disk drive.
Figure 21:
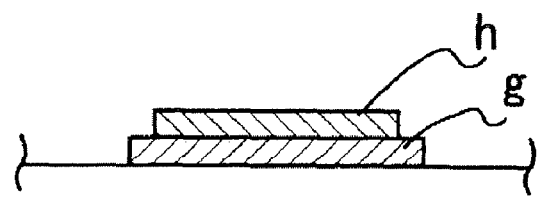
FIG. 21 schematically shows a state that a narrower film is formed on a wider film acting as the base in the thin film fabrication process.
Figure 22:
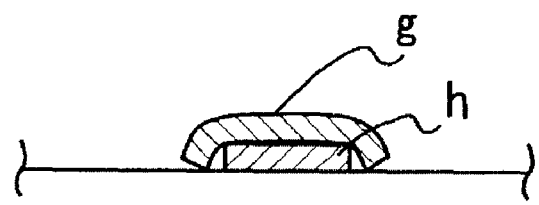
FIG. 22 schematically shows a state that a wider film is formed on a narrower film acting as the base in the thin film fabrication process.
Figure 23:
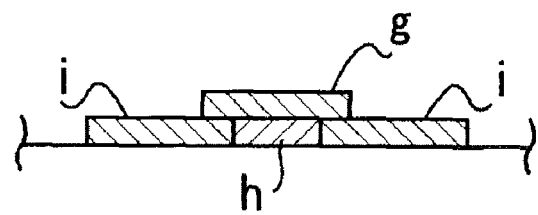
FIG. 23 schematically explains a method of overcoming a problem in the thin film fabrication process as illustrated in FIG. 22.
Figure 24:
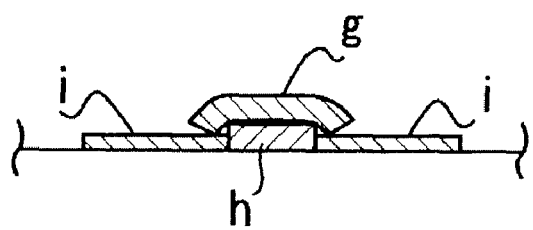
FIG. 24 schematically explains a new problem encountering in the thin film fabrication process as illustrated in FIG. 23.
Figure 25:
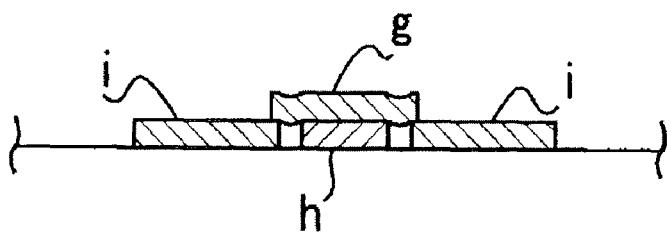
FIG. 25 schematically explains another problem arising in the thin film fabrication process as illustrated in FIG. 23.
Figure 26:
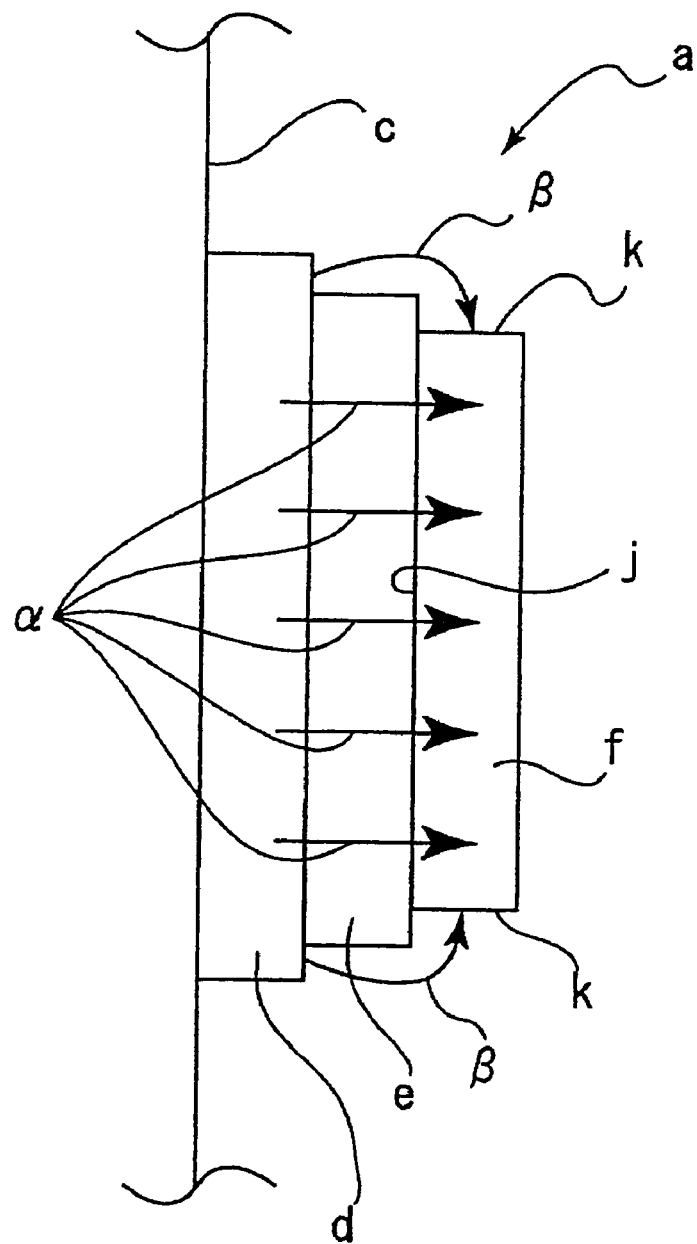
FIG. 26 schematically shows magnetic flux generated between the first magnetic core and the second magnetic core.

FIG. 18 is a plan view schematically illustrating the disk drive unit utilizing the above-mentioned magnetic head assembly 20, 20A, 20B, 60 or 70.

A disk drive unit 80 comprises a rotary driving mechanism 82 for rotating a disk shaped recording medium 81 and a head displacement mechanism 83 for displacing the magnetic head assembly 20, 20A, 20B, 60 or 70 in the radial direction of the disk shaped recording medium 81. The head displacement mechanism 83 includes a head slider 84 carrying the magnetic head assembly 20, 20A, 20B, 60 or 70, a suspension 85 for making the head slider 84 to resiliently contact with the disk shaped recording medium 81 and a suspension arm 86 that supports the suspension 85 and is coupled to the head displacement mechanism 83 (see FIG. 18). It is to be noted that the rotating direction of the disk shaped recording medium 81 is indicated by an arrow in FIG. 18.

The magnetic head assembly 20, 20A, 20B, 60 or 70 is adhered onto the head slider 84. And the second magnetic core 25, 62 or 72 in the magnetic head assembly 20, 20A, 20B, 60 or 70 is disposed at a leading position with respect to the first magnetic core 24, 61 or 71, i.e., at a position closer to the head slider 84.

Under the rotary condition of the disk shaped recording medium 81 by the above-mentioned rotary driving mechanism 82, signal recording is performed on the disk shaped recording medium 81 by the magnetic head assembly 20, 20A, 20B, 60 or 70 that is carried by the head slider 84.

Accordingly, in the disk drive unit 80 having the above configuration, the second magnetic core 25, 62 or 72 having a narrower width is brought into contact with the disk shaped recording medium 81 before the first magnetic core 24, 61 or 71 at the time of recording signals on the disk shaped recording medium 81, thereby reducing the side erase by the above-mentioned recording magnetic flux fringing and thus increasing the magnetic recording density.

It is to be noted that the first embodiment of the present invention is applied to the magnetic tape drive unit employing the rotary drum in the so-called helical scan tape system but the present invention should not be limited to such particular application. Of course, the present invention can be applied to a magnetic tape drive unit employing a linear scan tape system.

Additionally, although concrete shape and configuration of each of the embodiments according to the present invention have been described hereinabove, they are nothing but examples to implement the present invention and interpretation of the technical scope of the present invention should not be affected thereby.

What is claimed is:

1. A magnetic head assembly for a helical scan drive comprising:
a magnetic recording head, having a leading side and a trailing side relative to the traveling direction of a magnetic recording medium and fabricated in a thin film forming process, at least one auxiliary member adhered to either said leading side or said trailing side of said magnetic recording head, said magnetic recording head mounted in a helical scan drive and including:
a substrate,
a first magnetic core formed above said substrate and having a substantially rectangular-shaped front end face,
a second magnetic core formed above said substrate and having a front portion, a substantially rectangular-shaped front end face, and a back portion, said back portion being connected to said first magnetic core,
a magnetic gap of predetermined thickness provided between said front end face of said first magnetic core and said front end face of said second magnetic core,
a planar spiral coil having a portion thereof disposed between said first magnetic core and said second magnetic core for developing a magnetic flux between the first and second magnetic cores, wherein a width of said second magnetic core front end face is smaller than a width of said first magnetic core front end face; and
wherein the planar spiral coil is rectangular-shaped and a portion of the coil between widened portions of the magnetic cores is at a longer side of the rectangular-shaped planar spiral coil.

2. The magnetic head assembly for a helical scan drive according to claim 1, wherein said planar spiral coil and each of the first and second magnetic cores are separated by a non-magnetic film in the area between the first and second magnetic cores.

3. The magnetic head assembly for a helical scan drive according to claim 1, wherein a first non-magnetic film portion is provided between the substrate and the planar spiral coil outside of the area between the first and second magnetic cores, and a second non-magnetic film portion is provided between the first magnetic core and the planar spiral coil in the area between the first and second magnetic cores, the non-magnetic film portions providing a level surface for the formation of the planar spiral coil in a same plane inside and outside of the region defined by the overlap of the first and second magnetic cores.

4. A magnetic head assembly for a helical scan drive comprising:
a magnetic recording head, having a leading side and a trailing side relative to the traveling direction of a magnetic recording medium and fabricated in a thin film forming process, at least one auxiliary member adhered to either said leading side or said trailing side of said magnetic recording head, said magnetic recording head mounted in a helical scan drive and including:

a substrate, a first magnetic core formed above said substrate and having a substantially rectangular-shaped front end face, a second magnetic core formed above said substrate and having a front portion, a substantially rectangular-shaped front end face, and a back portion, said back portion being connected to said first magnetic core, a magnetic gap of predetermined thickness provided between said front end face of said first magnetic core and said front end face of said second magnetic core, a planar spiral coil having a portion thereof disposed between said first magnetic core and said second magnetic core for developing a magnetic flux between the first and second magnetic cores, wherein a width of said second magnetic core front end face is smaller than a width of said first magnetic core front end face; and wherein the first magnetic core and the second magnetic core each has a narrow region located nearest to the recording medium and a widening portion wherein the width of the cores each increases, the first magnetic core and the second magnetic core each has a widened portion that is substantially wider than the region located nearest the recording medium and which is adjacent the widening portions and the coil portion is located between the first and second magnetic cores only at the widened portions of the first and second magnetic cores, the widened portions having a generally constant width at the location of the coil portion, and further wherein the planar spiral coil is rectangular-shaped and the portion of the coil between the widened portions of the magnetic cores is at a longer side of the rectangular-shaped planar spiral coil.

5. The magnetic head assembly for a helical scan drive according to claim 4, wherein said planar spiral coil and each of the first and second magnetic cores are separated by a non-magnetic film in the area between the first and second magnetic cores.

6. The magnetic head assembly for a helical scan drive according to claim 4, wherein a first non-magnetic film portion is provided between the substrate and the planar spiral coil outside of the area between the first and second magnetic cores, and a second non-magnetic film portion is provided between the first magnetic core and the planar spiral coil in the area between the first and second magnetic cores, the non-magnetic film portions providing a level surface for the formation of the planar spiral coil in a same plane inside and outside of the region defined by the overlap of the first and second magnetic cores.

7. A magnetic recording system including a magnetic head assembly for a helical scan drive and a magnetic tape recording medium, the magnetic head assembly comprising:

a magnetic recording head, having a leading side and a trailing side relative to the traveling direction of the magnetic tape recording medium and fabricated in a thin film forming process, at least one auxiliary member adhered to either said leading side or said trailing side of said magnetic recording head, said magnetic recording head mounted in a helical scan drive and including:

a substrate, a first magnetic core formed above said substrate and having a substantially rectangular-shaped front end face, a second magnetic core formed above said substrate and having a front portion, a substantially rectangular-shaped front end face, and a back portion, said back portion being connected to said first magnetic core, a magnetic gap of predetermined thickness provided between said front end face of said first magnetic core and said front end face of said second magnetic core, a planar spiral coil having a portion thereof disposed between said first magnetic core and said second magnetic core for developing a magnetic flux between the first and second magnetic cores, wherein a width of said second magnetic core front end face is smaller than a width of said first magnetic core front end face, wherein said smaller second magnetic core front end face is formed on said leading side of the magnetic recording head such that the second magnetic core front end face passes across the magnetic tape recording medium before the first magnetic core front end face; and wherein the planar spiral coil is rectangular-shaped and a portion of the coil between widened portions of the magnetic cores is at a longer side of the rectangular-shaped planar spiral coil, the spiral coil being separated from the magnetic core portions by non-magnetic material.

8. The magnetic recording system according to claim 7, wherein the first magnetic core and the second magnetic core each has a narrow region located nearest to the recording medium and a widening portion wherein the width of the cores each increases, the first magnetic core and the second magnetic core each has the widened portion thereof that is substantially wider than the region located nearest the recording medium and which is adjacent the widening portions and the coil portion is located between the first and second magnetic cores only at the widened portions of the first and second magnetic cores, the widened portions having a generally constant width at the location of the coil portion.

9. The magnetic recording system according to claim 7, wherein said planar spiral coil and each of the first and second magnetic cores are separated by a non-magnetic film in the area between the first and second magnetic cores.

10. The magnetic recording system according to claim 7, wherein a first non-magnetic film portion is provided between the substrate and the planar spiral coil outside of the area between the first and second magnetic cores, and a second non-magnetic film portion is provided between the first magnetic core and the planar spiral coil in the area between the first and second magnetic cores, the non-magnetic film portions providing a level surface for the formation of the planar spiral coil in a same plane inside and outside of the region defined by the overlap of the first and second magnetic cores.

11. The magnetic recording system according to claim 8, wherein said planar spiral coil and each of the first and second magnetic cores are separated by a non-magnetic film in the area between the first and second magnetic cores.

12. The magnetic recording system according to claim 8, wherein a first non-magnetic film portion is provided between the substrate and the planar spiral coil outside of the area between the first and second magnetic cores, and a second non-magnetic film portion is provided between the first magnetic core and the planar spiral coil in the area between the first and second magnetic cores, the non-magnetic film portions providing a level surface for the formation of the planar spiral coil in a same plane inside and outside of the region defined by the overlap of the first and second magnetic cores.

13. A method of recording information onto a magnetic tape, the method comprising the steps of:

providing a magnetic recording head, having a leading side and a trailing side relative to the traveling direction of the magnetic tape and fabricated in a thin film forming process, at least one auxiliary member adhered to either said leading side or said trailing side of said magnetic recording head, said magnetic recording head mounted in a helical scan drive and including:

a substrate, a first magnetic core formed above said substrate and having a substantially rectangular-shaped front end face, a second magnetic core formed above said substrate and having a front portion, a substantially rectangular-shaped front end face, and a back portion, said back portion being connected to said first magnetic core, a magnetic gap of predetermined thickness provided between said front end face of said first magnetic core and said front end face of said second magnetic core, and a planar spiral coil having a portion thereof disposed between said first magnetic core and said second magnetic core for developing a magnetic flux between the first and second magnetic cores, wherein a width of said second magnetic core front end face is smaller than a width of said first magnetic core front end face, causing the magnetic recording head to come into contact with the magnetic tape in such a manner that the second magnetic core front end face passes across the magnetic tape before the first magnetic core front end face; and wherein the planar spiral coil is rectangular-shaped and a portion of the coil between widened portions of the magnetic cores is at a longer side of the rectangular-shaped planar spiral coil, the spiral coil being separated from the magnetic core portions by non-magnetic material.

14. The method of recording information onto a magnetic tape according to claim 13, wherein the first magnetic core and the second magnetic core each has a narrow region located nearest to the magnetic tape and a widening portion wherein the width of the cores each increases, the first magnetic core and the second magnetic core each has the widened portion thereof that is substantially wider than the region located nearest the magnetic tape and which is adjacent the widening portions and the coil portion is located between the first and second magnetic cores only at the widened portions of the first and second magnetic cores, the widened portions having a generally constant width at the location of the coil portion.

15. The method of recording information onto a magnetic tape according to claim 13, wherein said planar spiral coil and each of the first and second magnetic cores are separated by a non-magnetic film in the area between the first and second magnetic cores.

16. The method of recording information onto a magnetic tape according to claim 13, wherein a first non-magnetic film portion is provided between the substrate and the planar spiral coil outside of the area between the first and second magnetic cores, and a second non-magnetic film portion is provided between the first magnetic core and the planar spiral coil in the area between the first and second magnetic cores, the non-magnetic film portions providing a level surface for the formation of the planar spiral coil in a same plane inside and outside of the region defined by the overlap of the first and second magnetic cores.

17. The method of recording information onto a magnetic tape according to claim 14, wherein said planar spiral coil and each of the first and second magnetic cores are separated by a non-magnetic film in the area between the first and second magnetic cores.

18. The method of recording information onto a magnetic tape according to claim 14, wherein a first non-magnetic film portion is provided between the substrate and the planar spiral coil outside of the area between the first and second magnetic cores, and a second non-magnetic film portion is provided between the first magnetic core and the planar spiral coil in the area between the first and second magnetic cores, the non-magnetic film portions providing a level surface for the formation of the planar spiral coil in a same plane inside and outside of the region defined by the overlap of the first and second magnetic cores.

* * * * *